US007401189B2

(12) United States Patent
Bell, Jr. et al.

(10) Patent No.: US 7,401,189 B2
(45) Date of Patent: Jul. 15, 2008

(54) PIPELINING D STATES FOR MRU STEERAGE DURING MRU/LRU MEMBER ALLOCATION

(75) Inventors: Robert H. Bell, Jr., Austin, TX (US); Guy Lynn Guthrie, Austin, TX (US); William John Starke, Round Rock, TX (US); Jeffrey Adam Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/054,067

(22) Filed: Feb. 9, 2005

(65) Prior Publication Data

US 2006/0179232 A1    Aug. 10, 2006

(51) Int. Cl.
G06F 12/00    (2006.01)
G06F 13/00    (2006.01)
G06F 13/28    (2006.01)

(52) U.S. Cl. .................... 711/140; 711/136
(58) Field of Classification Search ............ 711/140, 711/136
See application file for complete search history.

(56) References Cited

U.S. PATENT DOCUMENTS

| | | | |
|---|---|---|---|
| 4,991,081 A * | 2/1991 | Bosshart ............... | 711/3 |
| 5,249,286 A | 9/1993 | Alpert et al. | |
| 5,353,425 A | 10/1994 | Malamy et al. | |
| 5,493,667 A | 2/1996 | Huck et al. | |
| 5,594,886 A | 1/1997 | Smith et al. | |
| 5,666,482 A * | 9/1997 | McClure ................ | 714/8 |
| 5,715,427 A | 2/1998 | Barrera et al. | |
| 5,778,430 A | 7/1998 | Ish et al. | |
| 5,781,924 A | 7/1998 | Zaitzeva et al. | |
| 5,913,224 A | 6/1999 | MacDonald | |
| 5,963,972 A | 10/1999 | Calder et al. | |
| 5,974,508 A | 10/1999 | Maheshwari | |
| 6,161,167 A | 12/2000 | Witt | |
| 6,434,670 B1 | 8/2002 | Arimilli et al. | |
| 6,725,341 B1 | 4/2004 | Peir et al. | |
| 6,738,888 B2 | 5/2004 | Chauvel | |
| 6,745,291 B1 | 6/2004 | York | |

(Continued)

OTHER PUBLICATIONS

"Selection of Least Recently Used Slot with Bad Locked Slots Involved", Nov. 1, 1978, IBM Corporation, vol. 21, Issue 6, p. 2290.*

Primary Examiner—Pierre-Michel Bataille
Assistant Examiner—Edward J Dudek
(74) Attorney, Agent, or Firm—Diana R. Gerhardt; Dillon & Yudell LLP

(57) ABSTRACT

A method and apparatus for preventing selection of Deleted (D) members as an LRU victim during LRU victim selection. During each cache access targeting the particular congruence class, the deleted cache line is identified from information in the cache directory. A location of a deleted cache line is pipelined through the cache architecture during LRU victim selection. The information is latched and then passed to MRU vector generation logic. An MRU vector is generated and passed to the MRU update logic, which is selects/tags the deleted member as a MRU member. The make MRU operation affects only the lower level LRU state bits arranged in a tree-based structure state bits so that the make MRU operation only negates selection of the specific member in the D state, without affecting LRU victim selection of the other members.

5 Claims, 17 Drawing Sheets

U.S. PATENT DOCUMENTS

| | | |
|---|---|---|
| 6,760,829 B2 | 7/2004 | Lasserre et al. |
| 6,823,427 B1 | 11/2004 | Sander et al. |
| 6,848,024 B1 * | 1/2005 | Rowlands et al. ........... 711/128 |
| 6,901,483 B2 | 5/2005 | Robinson et al. |
| 6,904,501 B1 | 6/2005 | Zhang et al. |
| 6,986,001 B2 | 1/2006 | Zhang |
| 6,993,628 B2 | 1/2006 | Starke |
| 6,996,679 B2 | 2/2006 | Cargnoni et al. |
| 7,039,760 B2 | 5/2006 | Arimilli et al. |
| 2004/0268099 A1 | 12/2004 | Smith et al. |

* cited by examiner

PIPELINING D STATES FOR MRU STEERAGE DURING MRU/LRU MEMBER ALLOCATION

CROSS REFERENCE TO RELATED APPLICATION(S)

The present invention is related to the following commonly assigned, co-pending applications: "Cache Mechanism and Method for Avoiding Cast Out on Bad Victim Select and Recycling Victim Select Operation," Ser. No. 11/054,394, and "Cache Member Protection With Partial Make MRU Allocation," Ser. No. 11/054,390, US1, both filed concurrently herewith; and "Cache Allocation Mechanism for Biasing Subsequent Allocations Based Upon Cache Directory State," Ser. No. 10/425,459, US1. The contents of the above applications are inco reference.

BACKGROUND OF THE INVENTION

1. Technical Field

The present invention relates generally to an improved data processing system, and in particular, to an improved method and apparatus for caching data in a memory. Still more particularly, the present invention relates to a method and computer system design for updating the LRU and MRU states of a cache.

2. Description of Related Art

Most early data processing systems consisted basically of a central processing unit, a main memory, and some sort of secondary input/output ("I/O") capability. In these earlier systems, the main memory was the limiting element. Typically, the main memory was designed first and the CPU was then created to match the speed of the memory. This matching was performed to optimize the processing speed and is necessary even with today's high speed computers. Over time, logic circuit speeds increased along with the capacity requirements of main memory. With the need for increasing capacity in the main memory, the speed of the main memory could not keep up with the increasing speed of the CPU. Consequently, a gap developed between the main memory and the processor cycle time, which resulted in un-optimized processing speeds. As a result, a cache memory was developed to bridge the gap between the memory and the processor cycle time.

Using a cache to bridge the performance gap between a processor and main memory has become important in data processing systems of various designs, from personal computers to work stations to data processing systems with high performance processors. A cache memory is an auxiliary memory that provides a buffering capability through which a relatively slow main memory can interface with a processor at the processor's cycle time to optimize the performance of the data processing system. Requests are first sent to the cache to determine whether the data or instructions requested are present in the cache memory. A "hit" occurs when the desired information is found in the cache. A "miss" occurs when a request or access to the cache does not produce the desired information. In response to a miss, one of the cache "lines" is replaced with a new one. The method to select a line to replace is called a replacement policy.

A number of different schemes for organizing a cache memory exist. For example, a fully associative mapping organization may be employed whereby a data address may exist in any location in the cache, or a direct mapping scheme may be employed in a cache memory whereby a data address may exist in only one location in the cache. A set associative scheme may be employed by partitioning the cache into distinct classes of lines, wherein each class contains a small fixed number of lines. This approach is somewhere between a direct mapped and a full associative cache. The classes of lines are usually referred to as "congruence classes." The lines in a congruence class are usually referred to as sets (which indicate the number of locations an address can reside) in a congruence class in a set associative cache.

One generally used type of replacement policy is the least recently used (LRU) policy. An LRU policy is built upon the premise that the least recently used cache line in a congruence class is the least worthy of being retained. So, when it becomes necessary to evict a cache line to make room for a new one, an LRU policy chooses as a victim a cache line which is the least recently accessed set (or member) within a congruence class.

For an LRU policy, two types of operations must be carried out against the LRU state (which is maintained for each congruence class in a cache).

A most recently used-update (MRU-update) operation typically occurs due to a cache hit. It adjusts the LRU state such that the "hit" member is ordered ahead of all other members in that congruence class, establishing the cache line in that member position as the most worthy member in the congruence class.

A least recently used-victim-selection (LRU-victim-selection) operation typically occurs when a cache miss requires that a member be allocated to hold a cache line arriving from elsewhere in the storage hierarchy. The operation determines which cache line is the least worthy of being retained in the congruence class, evicts that cache line, and places the newly arriving cache line in its member position.

Often, favorable operating characteristics and reduced complexity implementations for a cache can be achieved when the victim selection and state update portions of a cache allocation policy are tightly integrated with a common pipeline for accessing the cache arrays, directory arrays, and allocation policy (e.g. LRU) state arrays.

Further, in such implementations, further benefits are typically derived when the victim selection occurs as early as possible in the common pipeline, and when for each operational use of the pipeline, at most one cache allocation policy state update is performed.

As microprocessor chip fabrication technology advances toward smaller and smaller feature sizes, defect tolerance becomes more and more of a primary concern. Often, much of the area of a chip is covered by cache memory cells (often SRAM cells). Occasionally, the physical structure of chip at which a cache line is located becomes corrupted and is not able to be allocated to an incoming cache line.

One method for tolerating defects in these cells is to identify cache line compartments in the cache that have manufacturing defects, and mark those compartments as "deleted", so they will not be used, and hence, will not introduce errors into the data that would have been stored therein.

One technique for marking compartments as "deleted" is to define a cache state (which is called "D", meaning deleted) that will be stored in the cache directory entry corresponding to a given defective compartment. Unlike normal cache states, such as those included in standard MESI or similar protocols, which describe the coherence attributes of the cache line contained in a given compartment, the D-state indicates that any data contained in the compartment is invalid, and further indicates to the cache replacement policy logic that the compartment is unavailable for allocation.

During typical LRU allocation, however, cache lines in the D state are still represented within the LRU state array and may easily be selected as the LRU victim since the line is not being used and thus appears to be stale (or LRU). However, selection of a Deleted line causes a fault condition at the cache and may result in a crash of the entire processing system.

A few methods/mechanisms have therefore been proposed to prevent the selection of a line in the D state during LRU victim selection. Typically the cache replacement policy logic incorporates this per-member-deletion information from the cache directory directly into its victim selection logic, in a manner similar to the way in which it might have implemented an invalid-member-selection-bias prior to the techniques taught in Ser. No. 10/425,459. However, similar issues as those motivating the techniques presented in Ser. No. 10/425,459 drive the need for improvements to the cache replacement policy's incorporation of a per-member-deletion mechanism.

Therefore, it would be advantageous to have an improved method, apparatus, and computer for effectively preventing a cache member in the D state from ever being selected as the LRU victim member.

SUMMARY OF THE INVENTION

Disclosed is an improved method and apparatus for preventing selection of Deleted (D) members as an LRU victim during pipelined operations for LRU victim selection. During each cache access targeting the particular congruence class, the deleted cache line is identified from information in the cache directory. A location of a deleted cache line is pipelined through the cache architecture during LRU victim selection. The information is first latched and then passed to MRU vector generation logic, which generates a D member MRU vector. The MRU vector is passed to the MRU update logic, which tags the deleted member to be treated as a MRU member.

The tagging of the deleted cache line as MRU may occur contemporaneously with other members of the congruence class also being tagged MRU. In one embodiment, MRU selection of a D cache line occurs contemporaneously with member protection of other cache lines and while biasing I-states for LRU victim selection.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
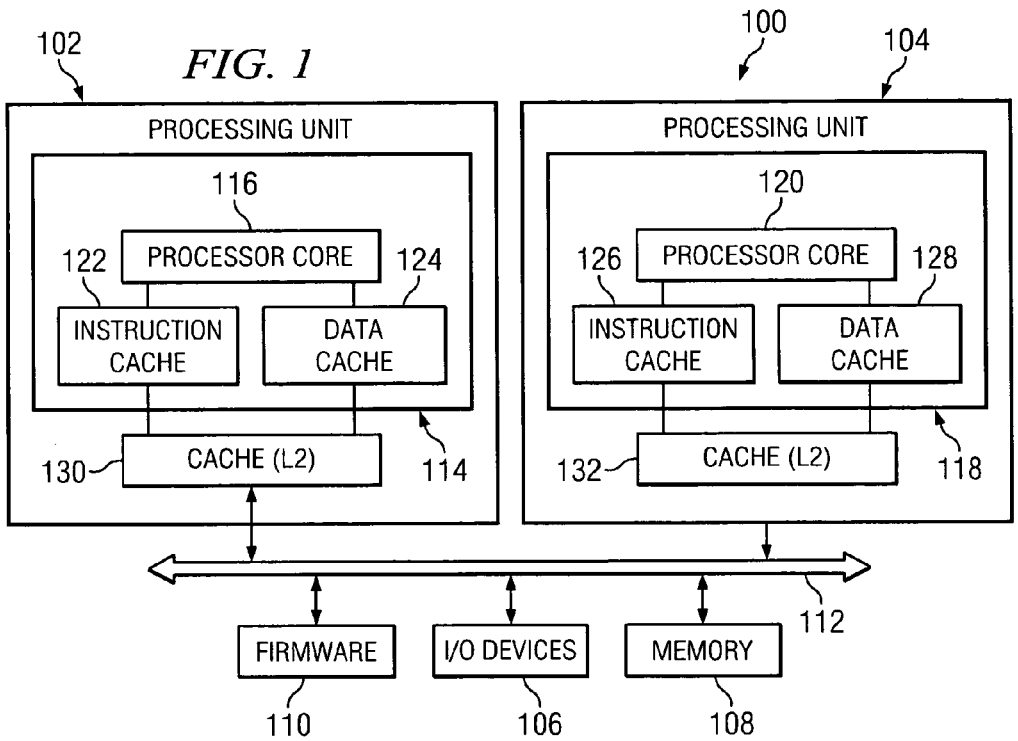
FIG. 1 is a block diagram of a data processing system in which a preferred embodiment of the present invention may be implemented.

With reference now to the figures and in particular with reference to FIG. 1, a block diagram of a data processing system is depicted in which a preferred embodiment of the present invention may be implemented. As illustrated, Data processing system 100 is an example of a conventional multiprocessor computer system. Data processing system 100 has several processing units, two of which, processing unit 102 and processing unit 104 are depicted. These processing units are connected to various peripheral devices, including input/output (I/O) devices 106 used to communicate with a user, memory 108 used by the processing units to carry out program instructions, and firmware 110 whose primary purpose is to seek out and load an operating system from one of the peripherals whenever the computer is first turned on. I/O devices 106 may take various forms, such as a display monitor, keyboard, and permanent storage device.

Processing units 102 and 104 communicate with the peripheral devices by various means, including, for example, a generalized interconnect or bus 112. Data processing system 100 may have many additional components which are not shown, such as serial and parallel ports for connection to devices, such as modems or printers. Those of ordinary skill in the art will further appreciate that there are other components that might be used in conjunction with those shown in the block diagram of FIG. 1. For example, a display adapter might be used to control a video display monitor, and a memory controller may be used to access memory 108. The data processing system also can have more than two processing units.

In a symmetric multi-processor (SMP) computer, all of the processing units are generally identical. In other words, the processors all use a common set or subset of instructions and protocols to operate, and generally have the same architecture. A typical architecture is shown in FIG. 1. In these examples, a processing unit 102 includes integrated chip 114, which contains processor core 116, and processing unit 104 contains integrated circuit 118, which contains processing core 120, instruction cache 126, and data cache 128. Processor cores 116 and 120 include registers and execution units.

These components are used to carry out program instructions to operate data processing system 100.

As illustrated, processing unit 102 and processing unit 104 also include caches, such as instruction cache 122, data cache 124, instruction cache 126, and data cache 128, within integrated circuits 114 and 118 in FIG. 1. These caches are implemented using high speed memory devices. Caches are commonly used to temporarily store values that might be repeatedly accessed by a processor, to speed up processing by avoiding the longer latency of loading the values from memory 108. These caches also are referred to as "on-board" when they are integrally packaged with the processor core on a single integrated chip. In these examples, the caches located within integrated circuit 114 and integrated circuit 118 are level 1 (L1) caches. Each cache is associated with a cache controller (not shown) that manages the transfer of data between the processor core and the cache memory.

A processing unit can include additional caches. For example, processing unit 102 includes cache 130 and processing unit 104 includes cache 132, which are referred to as level 2 (L2) caches because these memories support the on-board or L1 caches. In other words, cache 130 and cache 132 act as intermediaries between memory 108 and the on-board L1 caches: instruction cache 122, data cache 124, instruction cache 126, and data cache 128. These L2 caches can store a much larger amount of information, such as instructions and data, than the on-board caches can, but with a longer access penalty. For example, cache 130 and cache 132 may be integrated in chips having a storage capacity of 256 or 512 kilobytes, while instruction cache 122 and data cache 124 in processing unit 102 and instruction cache 126 and data cache 128 in processing unit 104 may have 64 kilobytes of total storage.

As illustrated, both cache 130 and 132 are connected to bus 112. All loading of information from memory 108 into processor core 116 passes through cache 130, while all loading of information into processor core 120 passes through cache 132. Although FIG. 1 depicts only a two-level cache hierarchy, multi-level cache hierarchies can be provided where there are many levels of serially connected caches. For example, L3, L4, and L5 caches may be used.

In an SMP computer, providing a coherent memory system is important. In other words, it is important to cause write operations to each individual memory location to be serialized in some order for all processors. For example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Virtually all coherency protocols operate only to the granularity of the size of a cache block. That is to say, the coherency protocol controls the movement of and write permissions for data on a cache block basis and not separately for each individual memory location.

A number of protocols and techniques for achieving cache coherence are known. At the heart of all these mechanisms for maintaining coherency is the requirement that the protocols allow only one processor to have a "permission" that allows a write to a given memory location (cache block) at any given point in time. As a consequence of this requirement, whenever a processor attempts to write to a memory location, the processor must first inform all other processors of its desire to write the location and receive permission from all other processors to carry out the write. The key issue is that all other processors in the system must be informed of the write by the initiating processor before the write occurs. Furthermore, if a block is present in the L1 cache of a given processing unit, this block is also present in the L2 and L3 caches of that processing unit. This property is known as inclusion and is well known to those skilled in the art.

To implement cache coherency in a system, the processors communicate over a common generalized interconnect, such as bus 112. The processors pass messages over the interconnect indicating their desire to read or write memory locations. When an operation is placed on the interconnect, all of the other processors "snoop" (monitor) this operation and decide if the state of their caches can allow the requested operation to proceed and if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

Figure 2:
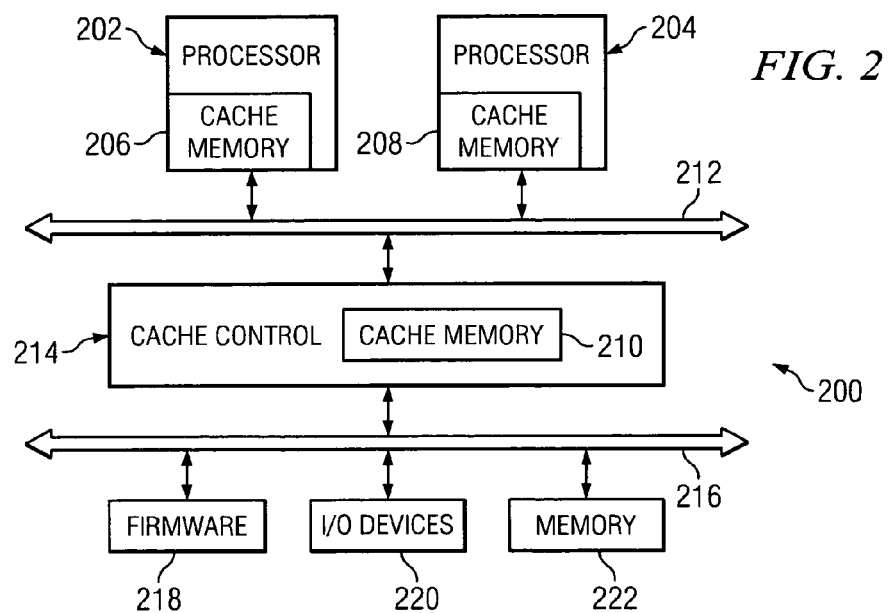
FIG. 2 is a diagram of another data processing system in which the present invention may be implemented.

With reference now to FIG. 2, a diagram of another data processing system is depicted in accordance with a preferred embodiment of the present invention. The processes and apparatus of the present invention may also be implemented within data processing system 200. This particular example, illustrated a shared L2 cache, while data processing system 100 in FIG. 1 illustrated unshared caches.

In this example, data processing system 200 includes two processors, processor 202 and processor 204. Cache memory 206 and cache memory 208 are cache memories located within processor 202 and processor 204, respectively. In this example, cache memory 210 is a level 2 cache memory that is shared by both processors. Access to this cache memory is provided by bus 212. Cache control 214 contains the logic for handling cache lines within memory 210 in response to requests from processors 202 and 204. Cache control 214 is connected to other components through bus 216. For example, firmware 218, I/O devices 220 and memory 222 are connected to bus 216.

Data processing system 100 and data processing system 200 include mechanisms for handling cache lines. A cache line is a unit of data that is retrieved from memory to a cache. A cache line is typically the smallest unit of data that may be sent from a memory to a cache. The present invention provides a method, apparatus, and computer instructions for supplementing least recently used (LRU) policies applied to handling cache lines in a cache.

An LRU policy, by definition, must maintain an ordered list of all members within each congruence class. A vector of "chronology bits" provides a mechanism for indicating an order amongst multiple entities. The vector consists of one bit for each possible pair of entities. The bit indicates the relative ordering within the pair. That is, for a given pair (i, j) the bit might be set to a "one" value if entity j precedes entity i, and the bit might be cleared to a "zero" value if entity i precedes entity j.

Figure 3:
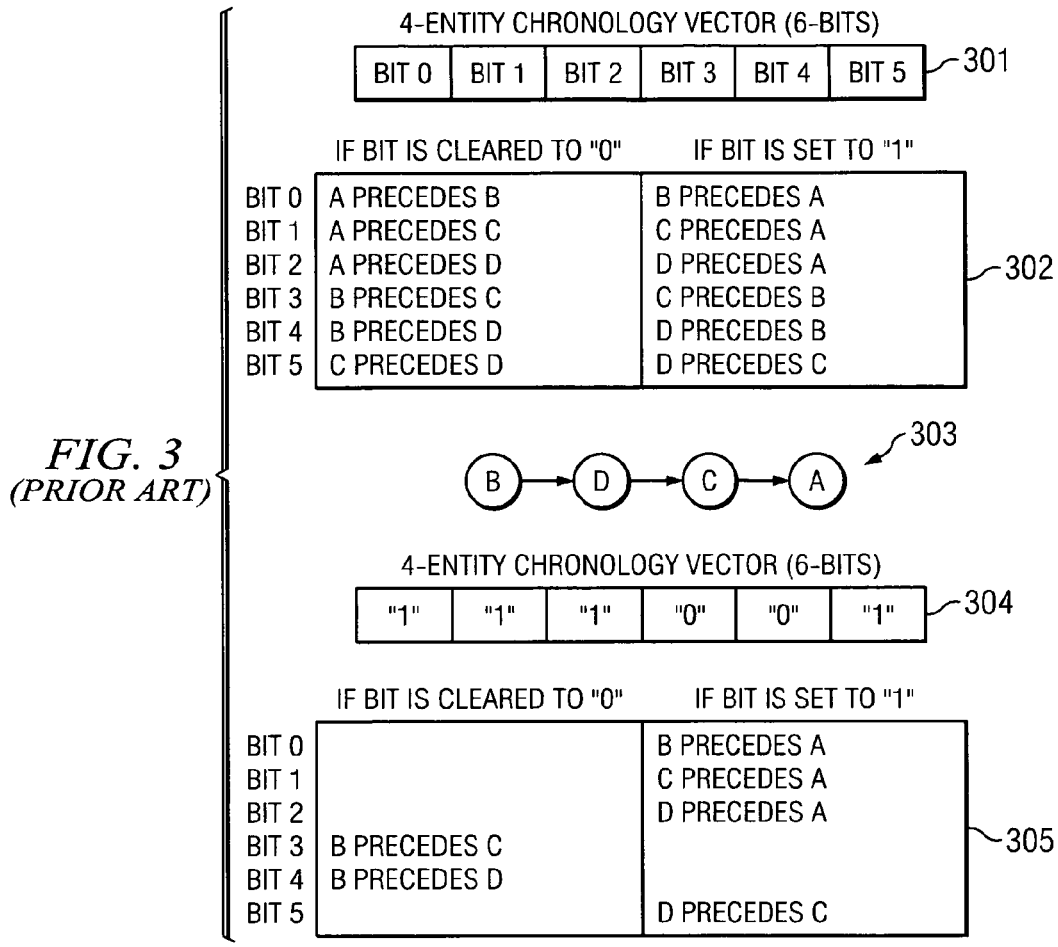
FIG. 3 is a diagram of components used in ordering entities.

For example, referring now to FIG. 3, components used in ordering entities are illustrated. Chronology vector 301 indicates an ordering between four entities (a, b, c, d) and consists of six bits. Referring to table 302, bit 0 indicates the ordering between entities a and b, bit 1 indicates the ordering between entities a and c, bit 2 indicates ordering between a and d, bit 3 indicates ordering for b and c, bit 4 is used in ordering b and d, and bit 5 indicates ordering between c and d.

To specify the ordering of members in ordering 303 as follows: b, d, c, a, the vector 304 would have the value: "111001", indicating an order specified by the rules 305 for each chronology bit. In general, a vector of chronology bits for determining the ordering amongst n entities requires $(n \times (n-1))/2$ bits.

Applying this technique to implement a "true" LRU policy for a 2-way associative cache requires a 1-bit vector; or for a 3-way cache requires a 3-bit vector; or 4-way: 6-bits; or 5-way: 10-bits; or 8-way: 28-bits; or 16-way: 120-bits. While chronology bits do not provide the most efficient possible bit-encoding (e.g., an encoding requiring the smallest number of bits), they do possess attributes ideally suited to a fast and inexpensive circuit implementation.

With a chronology vector implementation, an MRU-update operation is accomplished by setting a subset of the bits in the vector to a constant pattern (associated with the updated member) while leaving the other bits in the vector unchanged. The subset is comprised of the n−1 bits (where n is the associativity of the cache) which define the ordering between the updated member and each of the other members in the congruence class.

Figure 4A:
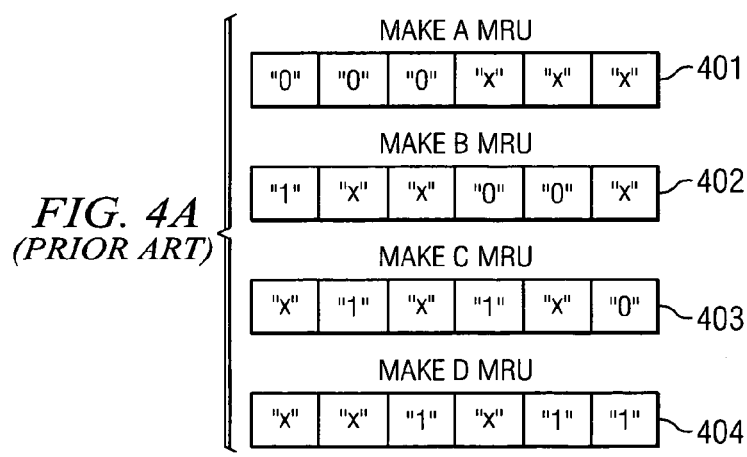
FIG. 4A is a diagram of constant patterns.
Figure 4B:
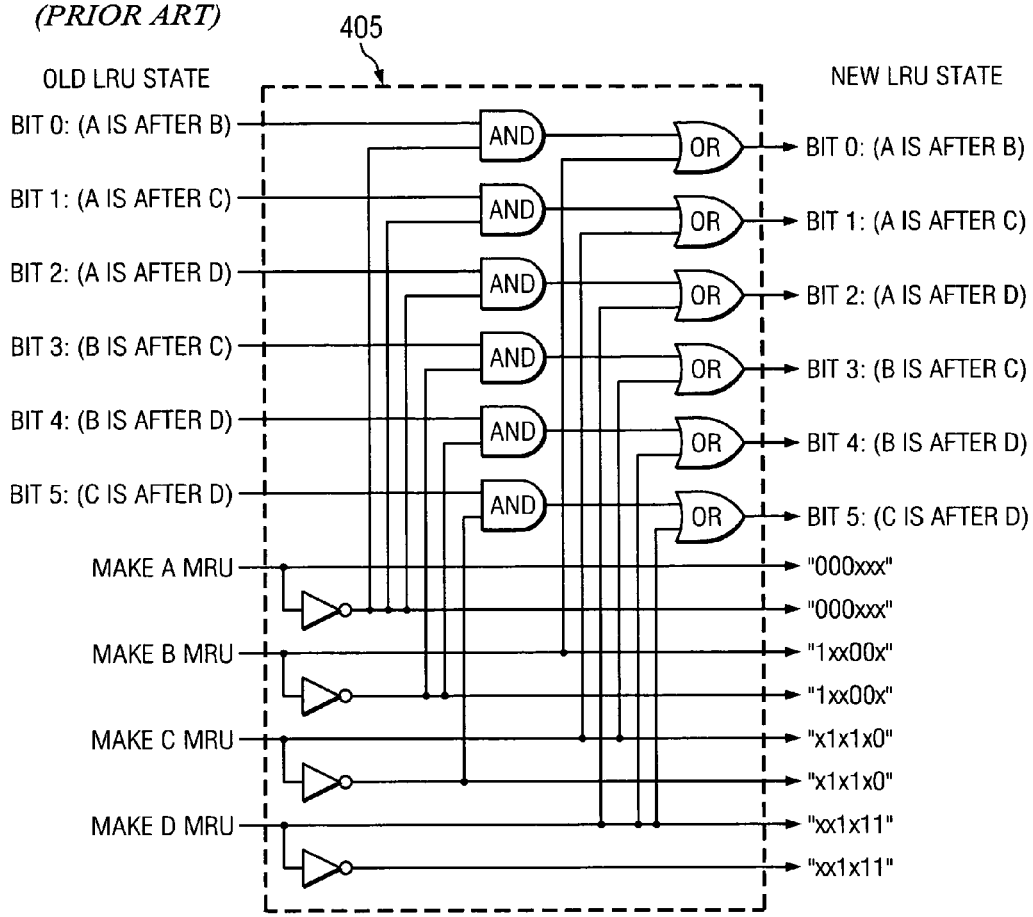
FIG. 4B is a circuit diagram of a known MRU-update function.

For example, referring now to FIG. 4A, the constant patterns are shown for a 401, b 402, c 403, and d 404. Turning next to FIG. 4B, circuit diagram 405 illustrates the MRU-update function in a manner familiar to those skilled in the art. Constant patterns 401, 402, 403, and 404, from FIG. 4A are used to annotate the control lines in circuit diagram 405 in FIG. 4B to associate each constant pattern with the set of control lines that establish that pattern into the LRU state.

With a chronology vector implementation, an LRU-victim-selection operation is accomplished by implementing an equation for each member position. The equation for a given member tests the same subset of n−1 bits (described above) associated with that member in the MRU-update operation, i.e., those bits which define the ordering between the member and each of the other members in the congruence class. The equation compares the tested bits against a constant pattern, returning "true" if there is a match, and returning "false" if there is not a match. As illustrated, one and only one of the equations will return a "true" value. The member position associated with that equation is the victim member position.

Figure 5A:
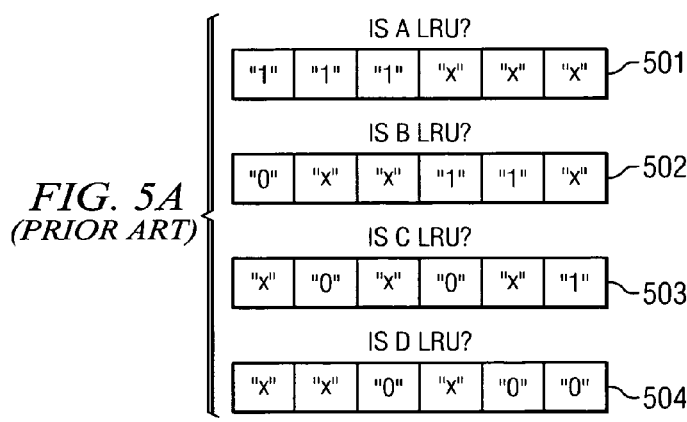
FIG. 5A is a diagram of constant patterns.
Figure 5B:
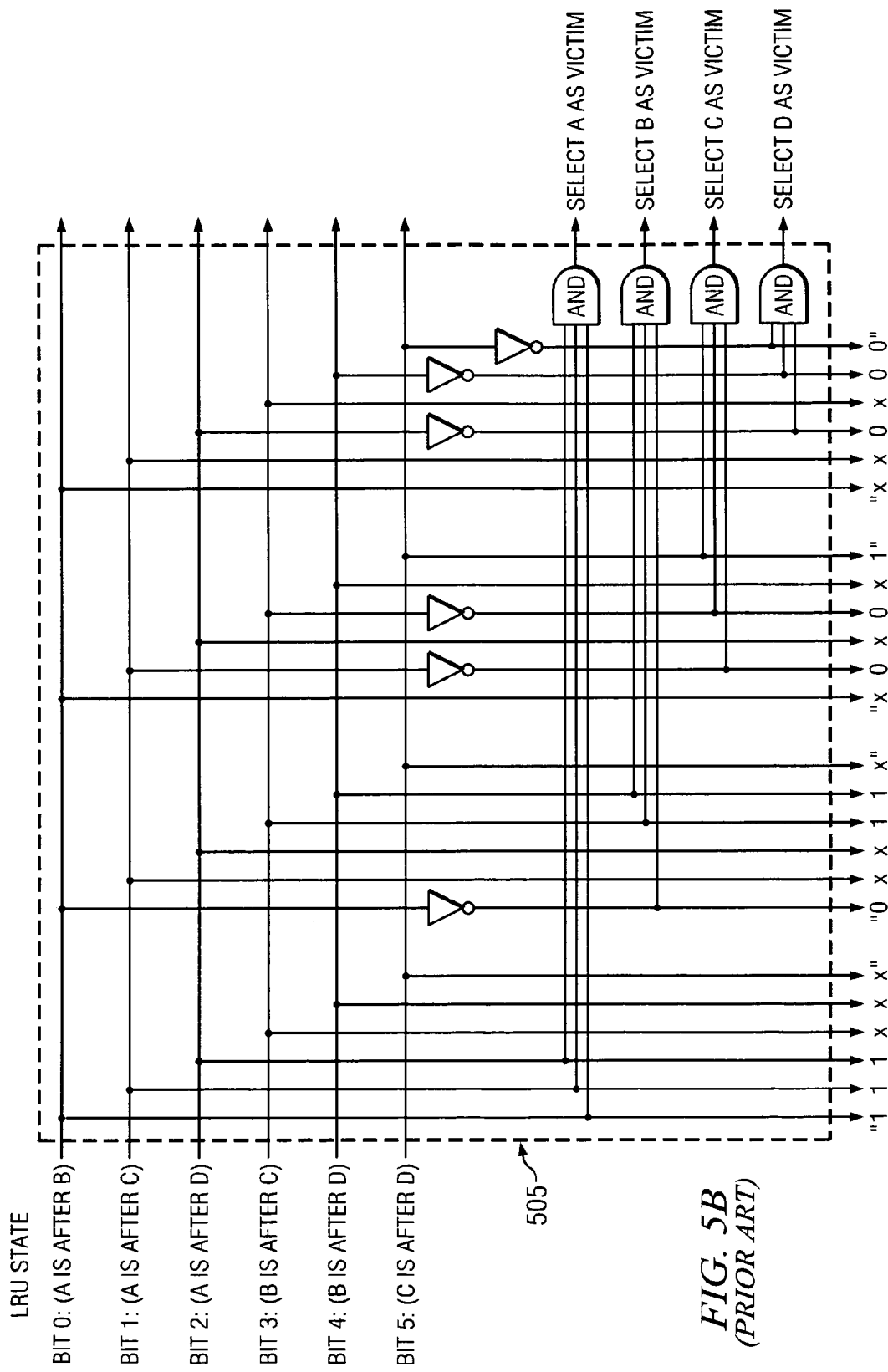
FIG. 5B is a circuit diagram of a known LRU-victim-selection function.

For example, referring now to FIG. 5A, the constant patterns are shown for a 501, b 502, c 503, and d 504. With reference to FIG. 5B, circuit diagram 505 illustrates the LRU-victim-selection function in a manner familiar to those skilled in the art. Constant patterns 501, 502, 503, and 504 from FIG. 5A are used to annotate the information lines in circuit diagram 505 in FIG. 5B to associate each constant pattern with the set of information lines that feeds the constant comparator equation for that pattern.

As associativity increases, the chronology vector technique can become prohibitively expensive. Those skilled in the art will recognize that less expensive "pseudo-LRU" policies are possible, which policies are roughly equal to "true" LRU behavioral value, but may be implemented in hardware with fewer bits required to track LRU state.

One such policy, well known in the art, is the tree-based pseudo-LRU approach. In this hierarchical approach, a set of multiple chronology vectors are organized as a tree of arbitrary depth. For non-leaf nodes of the tree, the number of branches from the node is equal to the number of entities ordered by the vector. Each leaf node of the tree defines the order amongst a subset of the members in a congruence class equal in number to the ordering capacity of the vector.

Figure 6:
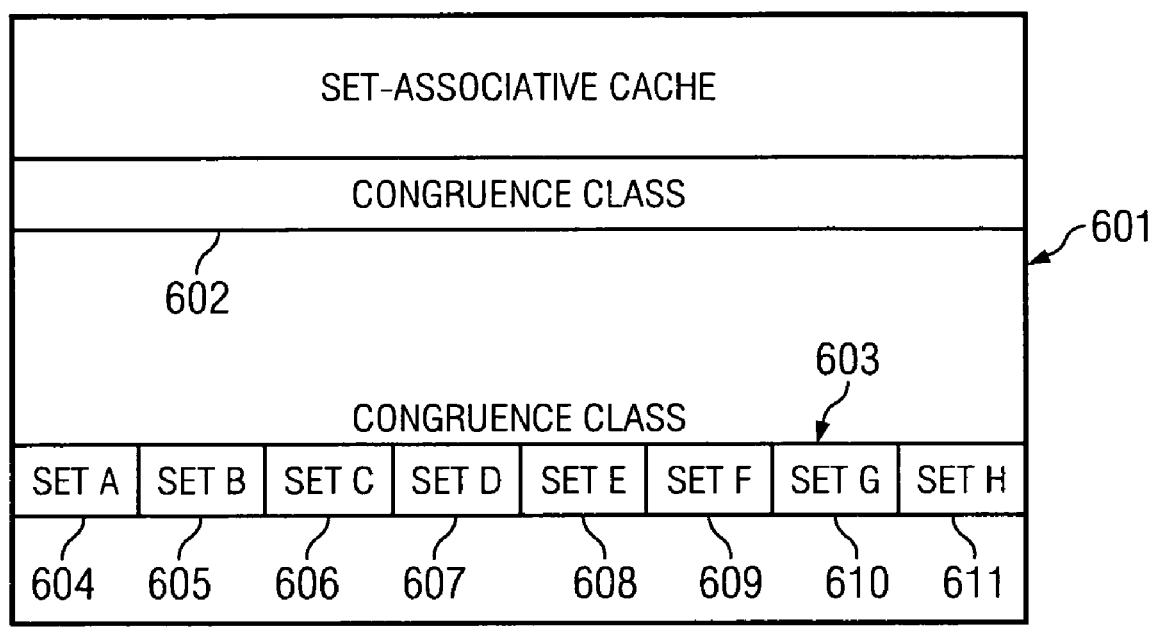
FIG. 6 is a diagram of an 8-way associative cache.

To illustrate this, referring now to FIG. 6, an 8-way associative cache 601 is shown. Cache 601 is comprised of multiple congruence classes 602 and 603, which are typically selected by a subset of the address of the cache line being referenced. Each congruence class is comprised of eight members, member A 604, member B 605, member C 606, member D 607, member E 608, member F 609, member G 610, and member H 611.

Often, tree-based LRU implementations are comprised of single bit (2-entity) chronology vectors. For example, referring now to FIG. 7, examples of tree based LRU structures are illustrated. In this example, vector 700 forms the basis for each node in a binary tree 702, which is 3 levels deep in this example. Binary tree 702 contains nodes 704, 706, 708, 710, 712, 714, and 716. Seven single bit vectors, vectors 718, 720, 722, 724, 726, 728, and 730, are provided to track the state for a binary-tree LRU scheme governing the 8-way associative cache with member positions A 732, B 734, C 736, D 738, E 740, F 742, G 744, and H 746.

Figure 7:
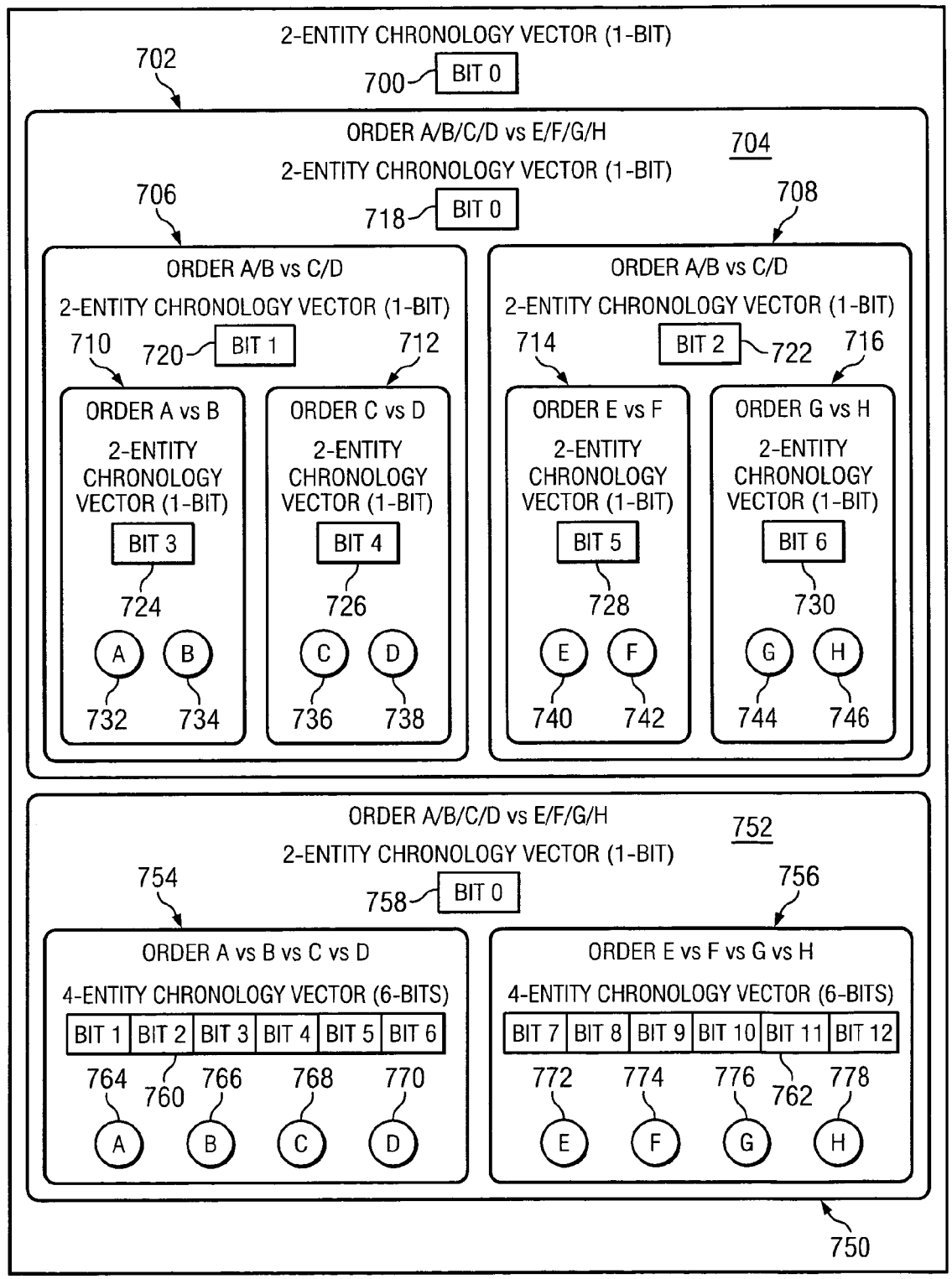
FIG. 7 is a diagram of several examples of tree based LRU structures.

In another example, still referring to FIG. 7, a combination of (2-entity) and (4-entity) vectors are used to construct a different tree-based LRU scheme, as illustrated by tree structure 750 for an 8-way associative cache. In this example, tree structure 750 includes nodes 752, 754, and 756. Node 752 includes one bit chronology vector 758, while node 754 contains six bit chronology vector 760, and node 756 contains six bit chronology vector 762. These vectors are used to point to member positions A 764, B 766, C 768, D 770, E 772, F 774, G 776, and H 778.

The present invention refers to a chronology vector within a tree-structure, such as that of tree structure 750, although multiple different tree configurations are possible. Within the exemplary tree structure, highest level node 752 includes one bit chronology vector 758 that is referred to as the root/control/pointer of the tree, which includes two additional nodes 752 and 754, each having a six bit chronology vector, representing the position of each member within a group relative to each other. Those skilled in the art will appreciate that the functionality of the one bit root/control/pointer vector within the LRU victim selection process, as described below, is further applicable to other configurations with other defined root/control pointer vectors.

Figure 8:
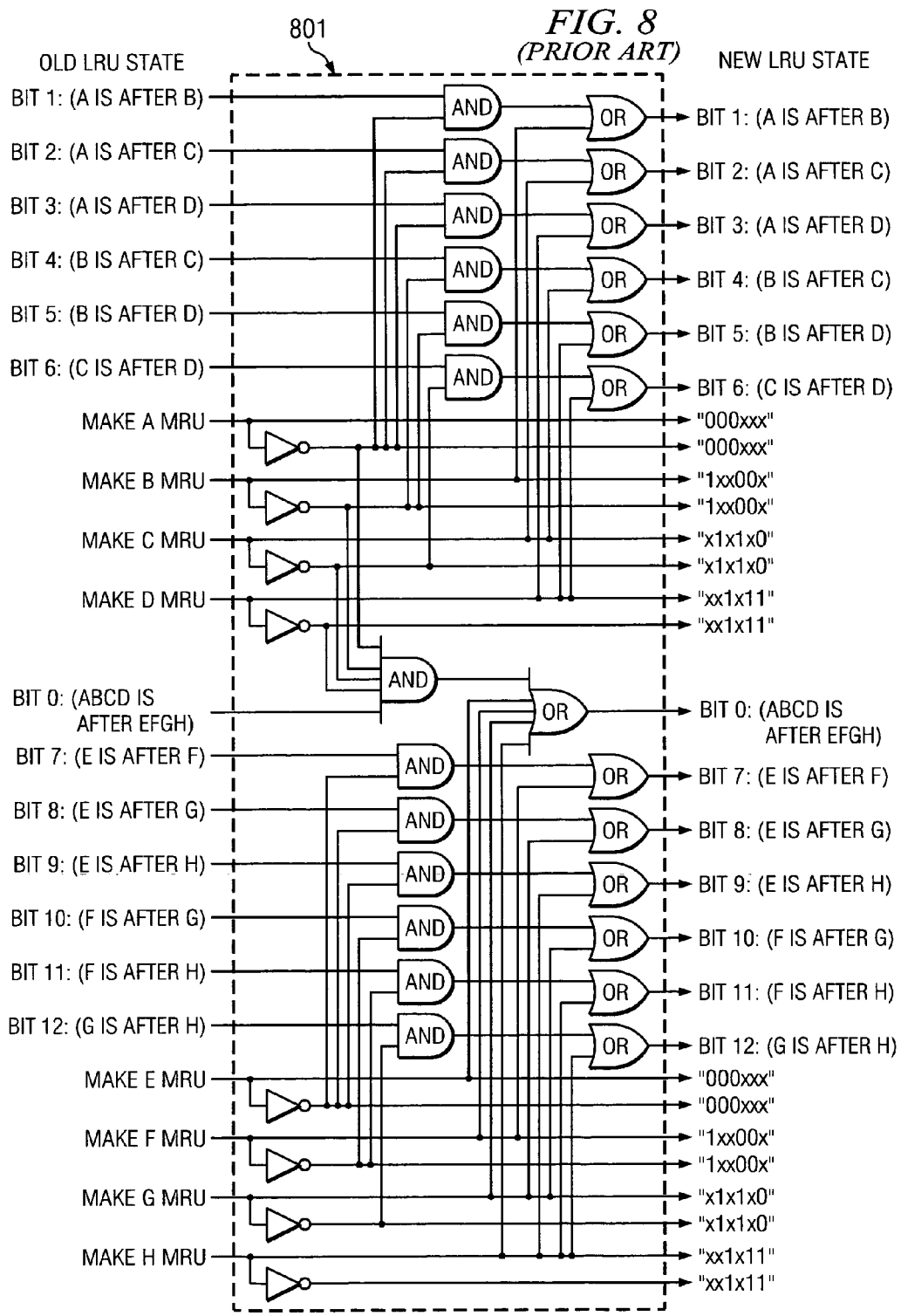
FIG. 8 is a circuit diagram of an MRU-update function.

Referring now to FIG. 8, a circuit diagram 801 illustrates the combination of varying size chronology vectors with a tree-based scheme embodied in an MRU-update function for the tree structure 750 shown in FIG. 7.

Figure 9A:
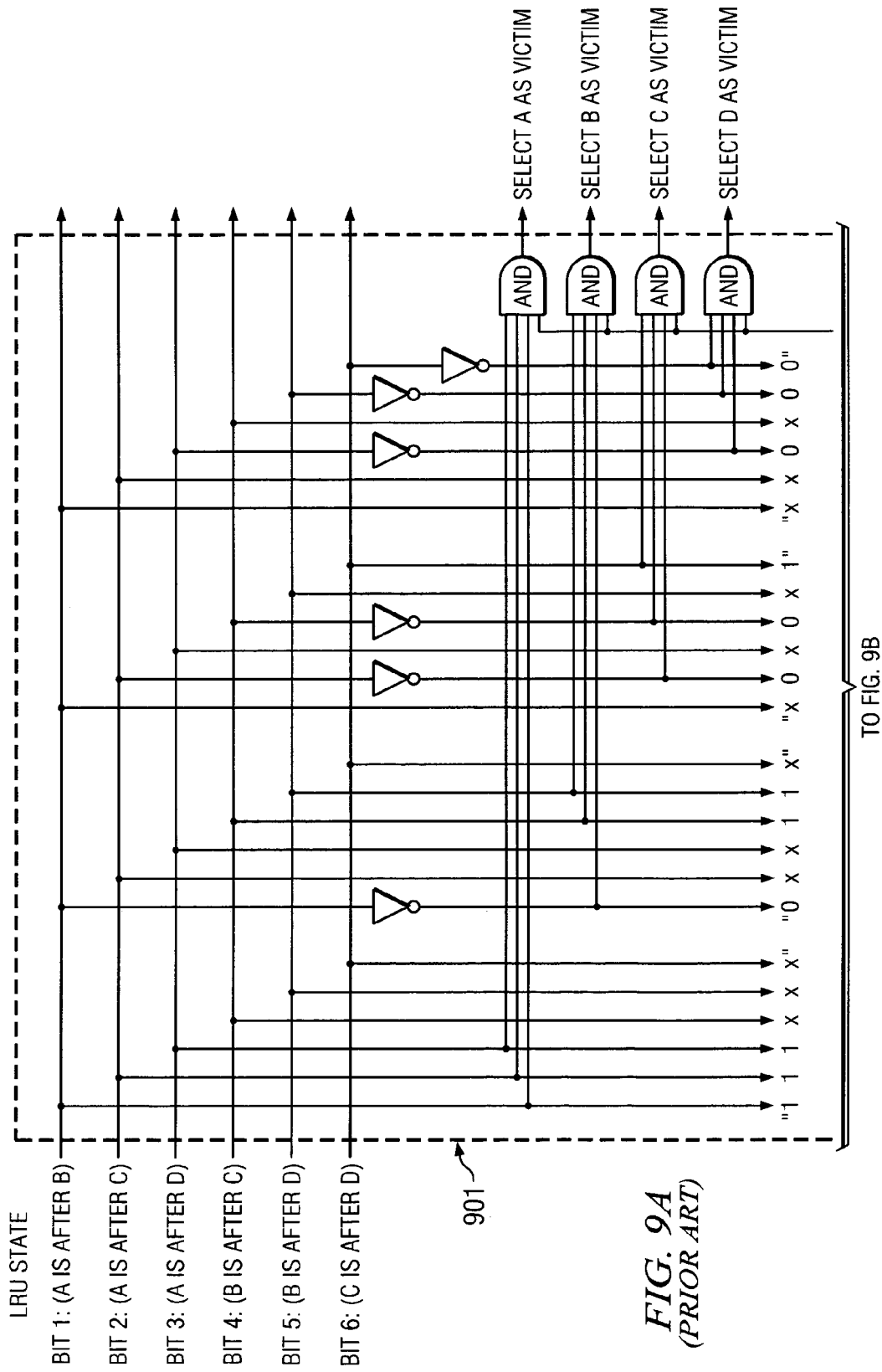
FIG. 9A and FIG. 9B provide a circuit diagram of an LRU victim selection function.
Figure 9B:
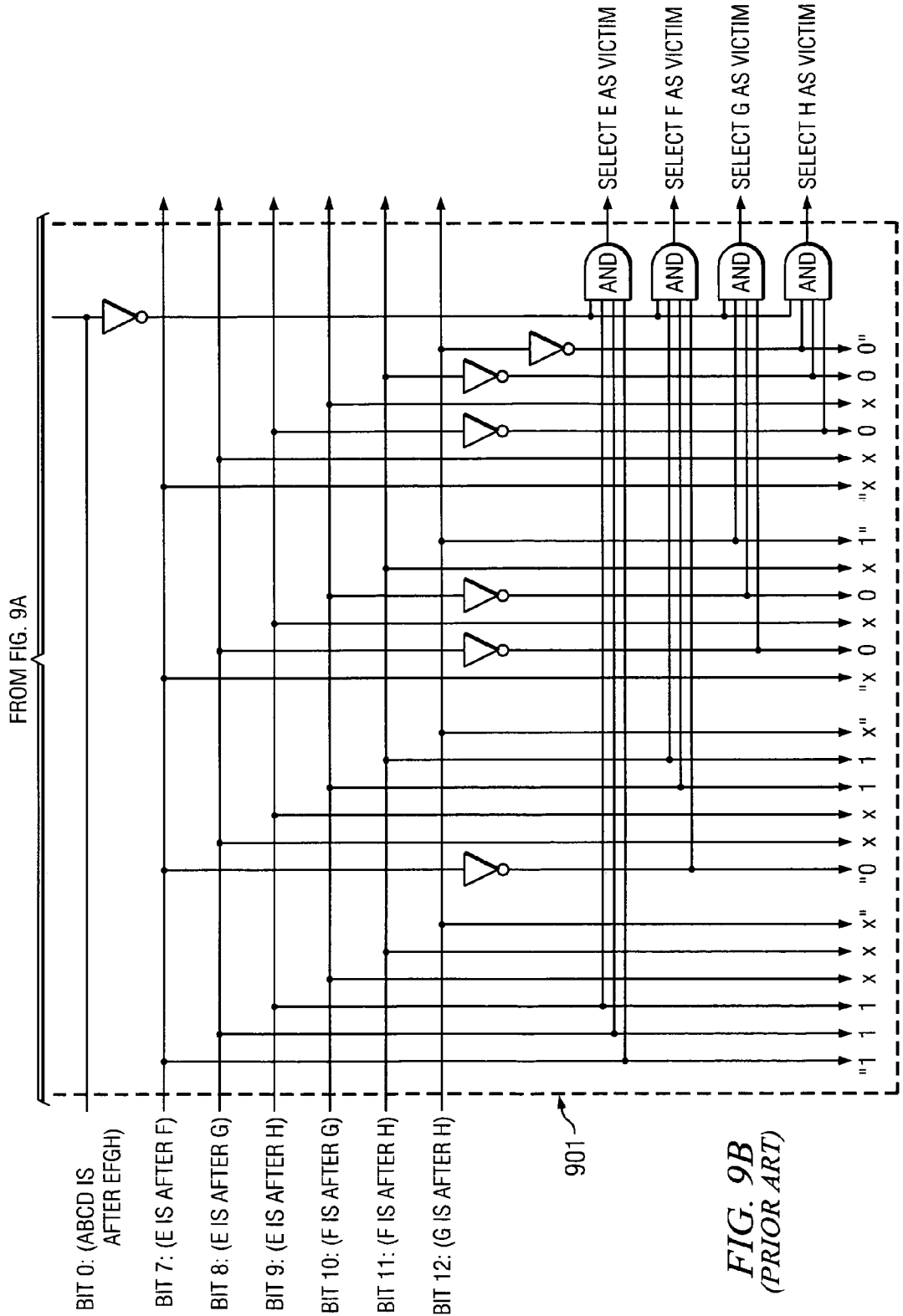

Referring now to FIG. 9A and FIG. 9B, a circuit diagram 901 illustrates the combination of varying size chronology vectors with a tree-based scheme embodied in an LRU victim selection function for the LRU tree 750 shown in FIG. 7.

Often, least recently used victim selection may be augmented in various ways. One such way is with an invalid member select override policy. The coherency state of a given cache line occupying a member in the cache can be useful in determining whether or not that member should be replaced. If the cache line is not valid, it is an ideal candidate for replacement, since nothing is lost when the cache line is over-written by a newly allocated cache line. The invalid member select override policy determines whether an invalid member exists in the congruence class from which a victim must be selected. If one or more such members exist, the policy chooses one of them as a victim, overriding the victim selected by the primary selection policy.

Often, favorable operating characteristics and reduced complexity implementations for a cache can be achieved when the victim selection and state update portions of a cache allocation policy are tightly integrated with a common pipeline for accessing the cache arrays, directory arrays, and allocation policy (e.g. LRU) state arrays.

Further, in such implementations, further benefits are typically derived when the victim selection occurs as early as possible in the common pipeline, and when for each operational use of the pipeline, at most one cache allocation policy state update is performed.

Figure 10:
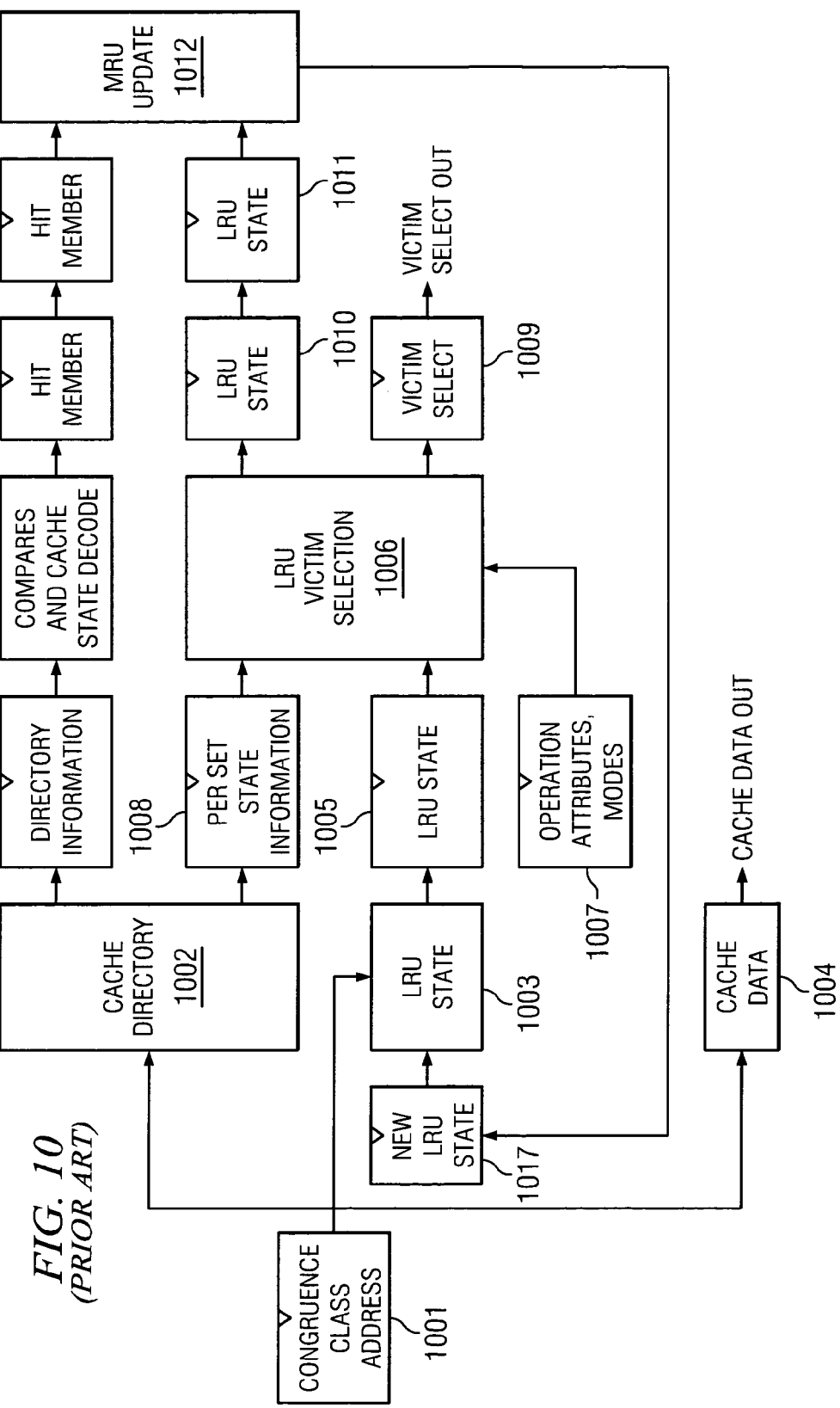
FIG. 10 is a diagram of a known cache architecture.

Referring now to FIG. 10, a cache architecture is illustrated. The cache congruence class index (or address) is held in latch 1001. From there, the address is simultaneously routed to the directory array 1002, the LRU state array 1003, and, for operations which speculatively read the cache, to the data array 1004.

From LRU state array 1003, the state information for the accessed congruence class is read and deposited into latch 1005. The state bits 0 through 12 of LRU tree 750, found in FIG. 7 are an example of such state information.

From staging latch 1005, the LRU state information is routed to least recently used (LRU) victim selection logic 1006, which is comprised largely of LRU victim selection logic such as that shown in circuit diagram 901, found in FIG. 9A and FIG. 9B. This logic always chooses a potential victim, whether one is needed or not. The selected victim member position is deposited in latch 1009. If selected victim was not needed, the LRU state will not be changed accordingly. This function will be described with the MRU update logic.

In addition to speculatively selecting a victim, victim selection logic 1006 also passes along some or all of the LRU state information to MRU update logic 1012, via pipelined latches 1010 and 1011. For implementations which cannot selectively write some bits to a given entry in LRU state array 1003, while leaving other bits in that entry unchanged, latches 1010 and 1011 must convey all the LRU state information (since all bits will be written when the array is updated). For implementations which can selectively write some bits to an entry in array 1003, while leaving other bits in that entry unchanged, latches 1010 and 1011 need only an indication of which member was selected as a victim.

A subset of the attributes of an operation and/or static mode switch settings is placed in latch 1007. From there, it is routed to LRU victim select logic 1006, which may be augmented by a set of operational modes and possibly by one or more congruence class partitioning policies, well known to those of ordinary skill in the art.

Referring once again to FIG. 10, the least recently used victim selection logic 1006 may also be augmented by an invalid member select override policy. The invalid member select override policy makes use of cache member state information typically found in the cache directory 1002. A subset of the coherency state information (e.g., the valid bit) for all the members in the congruence class (indexed by 1001) is read from the directory 1002 and placed in latch 1008. From there, it is routed to the LRU victim select logic 1006, which may be augmented by an invalid member select override policy.

Referring once again to FIG. 10, the MRU update logic 1012 receives a pipelined indication of which member was speculatively selected as a potential victim from staging latch 1011. Meanwhile, the contents of the associated congruence class lookup in the directory 1002 were latched 1013 and routed to the compare and decode logic 1014.

The compare and decode logic 1014 determines whether the operation is a cache hit, and if so, which member in the congruence class is the hit member. This logic also determines whether or not the operation must be aborted due to a collision with a protected resource, or due to a permission conflict between the operation type and the coherence state of the cache line.

The "hit member" information indicates one of the following: no operation occurred (either there was no operation at that time or the operation was aborted), a cache miss occurred, or a cache hit occurred against a given member position. The "hit member" information is deposited into latch 1015, and pipelined forward to latch 1016, from which it is routed to the MRU update logic 1012.

In the MRU update logic 1012, the following information is collected for a given operation: whether or not an operation occurred (from latch 1016); if it occurred, whether the operation was a hit or miss (from latch 1016); if it was a hit, which member position contained the cache line that was hit (from latch 1016); if it was a miss, which member position was chosen to allocate the new cache line (from latch 1011).

If no operation occurred, the LRU state will remain unchanged. If a hit operation occurred, the LRU state will be updated such that the hit member position is established as MRU. If a miss operation occurred, the LRU state will be updated such that the allocated member position is established as MRU. Circuit diagram 801 in FIG. 8 shows an example implementation of this MRU update function.

The updated LRU state information is deposited in latch 1017, poised for writeback into the LRU state array 1003. For implementations which cannot selectively write some bits to a given entry in the LRU state array 1003, while leaving other bits in that entry unchanged, latch 1017 holds the entire contents of the entry to be written into the array. It must convey all the LRU state information (since all bits will be written when the array is updated). For implementations which can selectively write some bits to an entry in array 1003, while leaving other bits in that entry unchanged, latch 1017 consists of a write enable mask (indicating which bits of the entry will be written), as well as a vector of update bit values (for bits that will be written according to the mask).

Those of ordinary skill in the art will recognize the following properties. The state information for the invalid member selection override exists in the directory 1002. As caches grow larger (affecting size of data array 1004, directory array 1002, and LRU state array 1003), the latency through a directory 1002 and to the victim selection logic 1006 grows relative to the latency through the LRU state array 1003 to the victim selection logic 1006. Also, the circuit complexity (and latency) grows beyond what is shown in circuit diagram 901 of FIG. 9A and FIG. 9B. Increases in the aggressiveness of processor operating frequencies compound this latency difference, making it more and more difficult to balance the desire to select a victim early with difference in latency between early arriving LRU state info (from latch 1005) and ever-later arriving invalid cache state info (from latch 1008).

Figure 12:
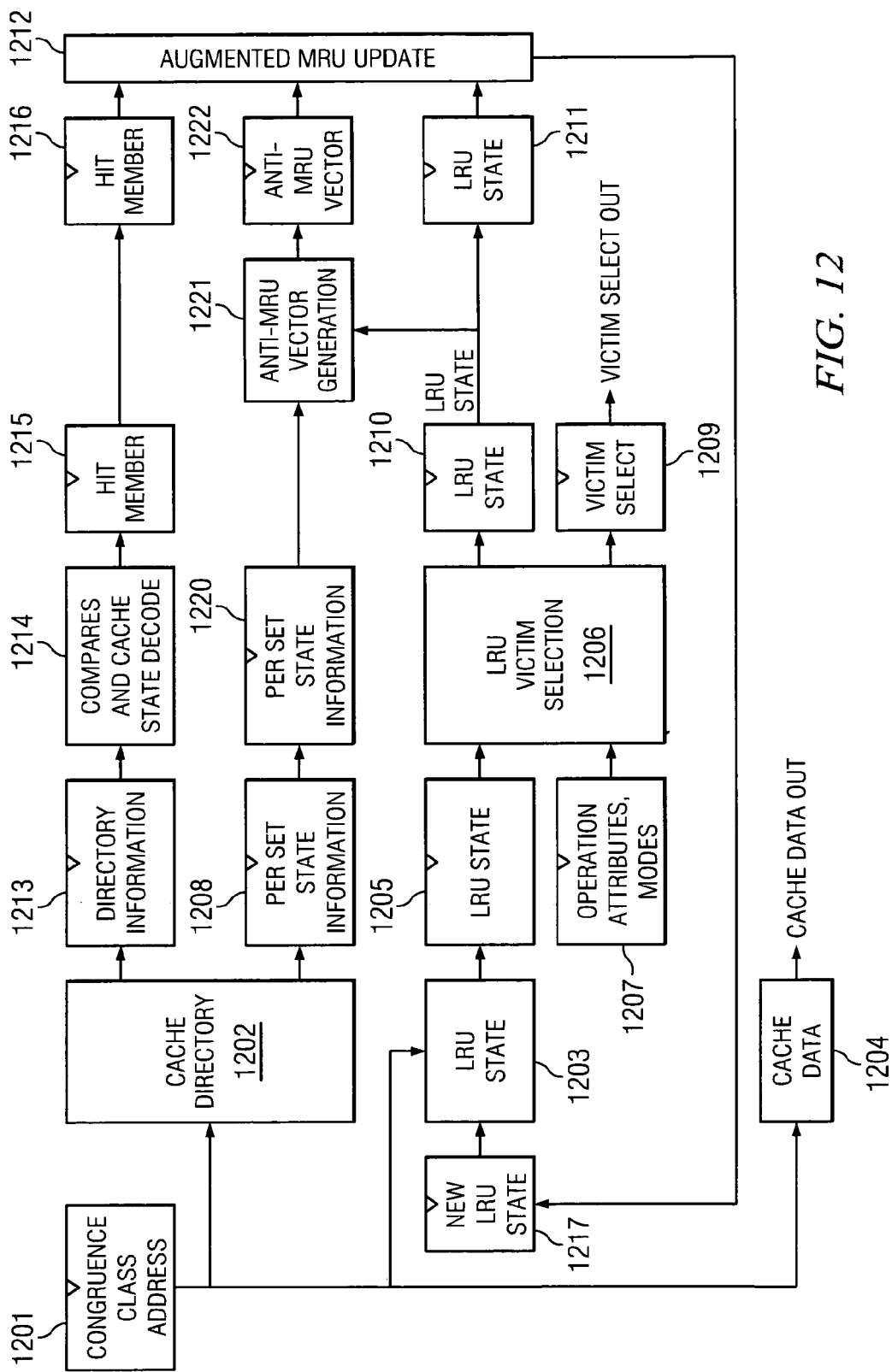
FIG. 12 is a cache architecture including LRU augmentations for biasing Invalid members for LRU victim selection.

Referring now to FIG. 12, a cache architecture including LRU augmentations is depicted. In this example, the cache congruence class index (or address) is held in latch 1201. From there, the address is simultaneously routed to the directory array 1202, the LRU state array 1203, and, for operations which speculatively read the cache, to the data array 1204.

From LRU state array 1203, the state information for the accessed congruence class is read and deposited into latch 1205. The state bits 0 through 12 of LRU tree 750, found in FIG. 7 are an example of such state information.

From staging latch 1205, the LRU state information is routed to least recently used (LRU) victim selection logic 1206, which is comprised largely of LRU victim selection logic such as that shown in circuit diagram 901, found in FIG. 9A and FIG. 9B. This logic always chooses a potential victim, whether one is needed or not. The selected victim member position is deposited in latch 1209. If selected victim was not needed, the LRU state will not be changed accordingly. This function will be described with the MRU update logic.

In addition to speculatively selecting a victim, victim selection logic 1206 also passes along some or all of the LRU state information to MRU update logic 1212, via pipelined latches 1210 and 1211. For implementations which cannot selectively write some bits to a given entry in LRU state array 1203, while leaving other bits in that entry unchanged, latches 1210 and 1211 must convey all the LRU state information (since all bits will be written when the array is updated). For implementations which can selectively write some bits to an entry in array 1203, while leaving other bits in that entry unchanged, latches 1210 and 1211 need only an indication of which member was selected as a victim.

A subset of the attributes of an operation and/or static mode switch settings are placed in latch 1207. From there, it is routed to LRU victim select logic 1206, which may be augmented by a set of operational modes and possibly by one or more congruence class partitioning policies.

To avoid the circuit timing challenges imposed by the invalid member select override policy described in FIG. 10, the mechanism utilizes invalid member information to bias the LRU state when an LRU state update occurs, not during victim selection. This process was the focus of related patent application, Ser. No. 10/425,459, which has previously been incorporated herein.

To this purpose, the cache line valid information read from the directory 1202 and placed in latch 1208, is no longer routed to the victim select logic 1206. Rather the invalid member select override policy is removed altogether from victim select logic 1206.

Instead, the information from latch 1208 is pipelined through latch 1220 to the anti-MRU vector generation logic 1221. This information consists of a vector (from latch 1220) comprised of one bit per member in the congruence class. For each member, the bit indicates whether or not the member is valid, with a "1" value indicating that the cache line in a given member position is valid, and a "0" value indicating that the cache line in a given member position is not valid (i.e., desirable for replacement).

The LRU state vector (from latch 1210) is also routed to the anti-MRU vector generation logic 1221. From this state vector, the victim member selected by logic 1206 is determined.

An anti-MRU vector is generated by altering the informational vector from latch 1220 in the following manner: All of the bits in the informational vector from latch 1220 are passed unchanged to the anti-MRU vector, with the exception of the bit corresponding to the victim member (as indicated in the LRU state vector information from latch 1210). This particular bit in the anti-MRU vector is set to a "1" value. This will prevent the update logic from biasing the allocated member (which should be marked as MRU) with an anti-MRU update.

The anti-MRU vector is deposited in latch 1222, from which it is routed to the augmented MRU update logic 1212. In addition, the augmented MRU update logic 1212 receives a pipelined indication of which member was speculatively selected as a potential victim from staging latch 1211. Meanwhile, the contents of the associated congruence class lookup in the directory 1202 were latched 1213 and routed to the compare and decode logic 1214.

The compare and decode logic 1214 determines whether the operation is a cache hit, and if so, which member in the congruence class is the hit member. It also determines whether or not the operation must be aborted due to a collision with a protected resource, or due to a permission conflict between the operation type and the coherence state of the cache line.

The "hit member" information indicates one of the following: no operation occurred (either there was no operation at that time or the operation was aborted), a cache miss occurred, or a cache hit occurred against a given member position. The "hit member" information is deposited into latch 1215, and pipelined forward to latch 1216, from which it is routed to MRU update logic 1212.

In augmented MRU update logic 1212, the following information is collected for a given operation: whether or not an operation occurred (from latch 1216); if it occurred, the anti-MRU vector (from latch 1222); if it occurred, whether the operation was a hit or miss (from latch 1216); if it was a hit, which member position contained the cache line that was hit (from latch 1216); if it was a miss, which member position was chosen to allocate the new cache line (from latch 1211).

If no operation occurred, the LRU state will remain unchanged. If a hit operation occurred, the LRU state will be updated such that the hit member position is established as MRU. If a miss operation occurred, the LRU state will be updated such that the allocated member position is established as MRU.

In addition, if any operation occurred, an "anti-MRU" update occurs for each member in the congruence class indicated by the anti-MRU vector. The anti-MRU update performs the opposite function as an MRU update. While an MRU-update reorders one member with respect to all other members, establishing that one member as the most favored, an anti-MRU update reorders one member with respect to all other members, establishing that one member as the least favored.

MRU update logic 1212 takes advantage of a property of chronology vectors, which property allows multiple update operations to be carried out upon a chronology vector simultaneously. Utilizing this property, the MRU update function performs one MRU-update and multiple "anti-MRU" updates simultaneously.

Of course, given the definition of these operations, their behavior can only be defined as occurring in some particular order relative to one another. When taking advantage of chronology vectors to perform multiple updates simultaneously, the ordering is biased either toward "1" encodings (set-dominant) or "0" encodings (reset-dominant).

In these examples, cache directory 1202 is read for both hits and misses. An MRU update by augmented MRU update logic 1212 occurs in both cases. As a result, an anti-MRU bias for a given congruence class may be performed for any hit or miss to that congruence class.

Referring once again to FIG. 12 the updated LRU state information is deposited in latch 1217, poised for writeback into the LRU state array 1203. For implementations which cannot selectively write some bits to a given entry in the LRU state array 1203, while leaving other bits in that entry unchanged, latch 1217 holds the entire contents of the entry to be written into the array. It must convey all of the LRU state information (since all bits will be written when the array is updated). For implementations which can selectively write some bits to an entry in array 1203, while leaving other bits in that entry unchanged, latch 1217 consists of a write enable mask (indicating which bits of the entry will be written), as well as a vector of update bit values (for bits that will be written according to the mask).

As described in greater details in co-pending and related patent application, Ser. No. 11/054,390, certain operations are occasionally desired to be protected from being selected as victims during LRU victim selection, such as when unbalanced caching behavior occurs. Thus, the related application provides a method and apparatus for enabling protection of a particular member of a congruence class of a cache during LRU victim selection. Some of that description is repeated herein for completeness, though some details have been removed.

LRU state array within the cache architecture is expanded to include additional "protection" bits in addition to the state bits utilized for LRU victim determination and selection. The protection bits serve as a pointer to identify the particular member of the congruence class that is to be protected. A protected member is not removed from the cache during standard LRU victim selection, unless that member is invalid.

The MRU update logic includes logic for overriding the default make MRU handling of the protected member when that member is determined to be Invalid. To prevent the make MRU process for a protected member from biasing the normal victim selection mechanism to always point away from the group with the protected member in a tree-based scheme, a separate make MRU operation, called make root MRU, is introduced for determining when to toggle/update the control/host/root bit (LRU state bit 0) in the chronology tree structure The make MRU operation thus affects only the other LRU state bits (e.g., bits 1-12 for an 8 member congruence class represented by two levels in the tree structure). The make MRU generated by the protection bits thus only protects the specific member and does not affect the normal operation of LRU victim selection logic for all other members.

Figure 11A:
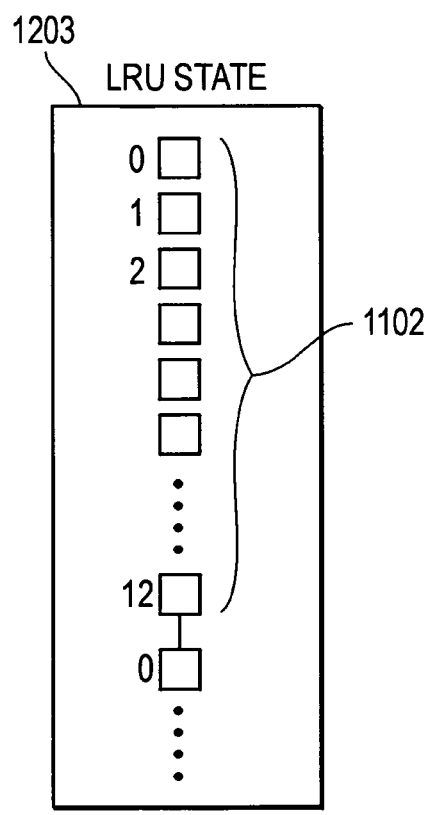
FIGS. 11A and 11B respectively illustrate a convention LRU state array with 13 state bits and the extended LRU state array with added member protection bits according to one embodiment of the invention.
Figure 11B:
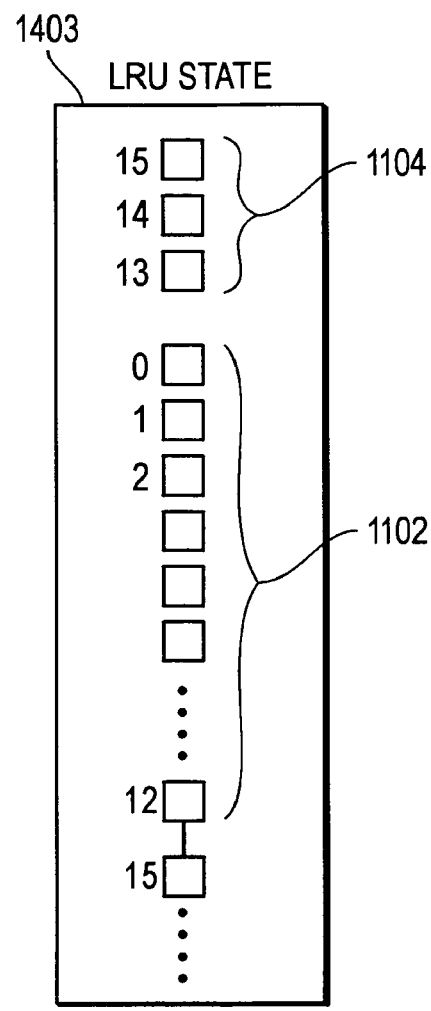

The LRU state array is expanded to include three additional LRU state bits per entry, referred to herein as "protection bits" (or member protection bits). Internal views of the number and allocation of the state bits for one entry within a conventional LRU state array and within an expanded LRU state array are respectively provided by FIGS. 11A and 11B, described in the related patent application.

As now described, the addition of the member protection bits directly affects MRU allocation within the augmented MRU update logic (1512). As described below, augmented MRU update logic (1512) is expanded to include several logic components required to support the member protection functionality associated with the protection bits.

Figure 14:
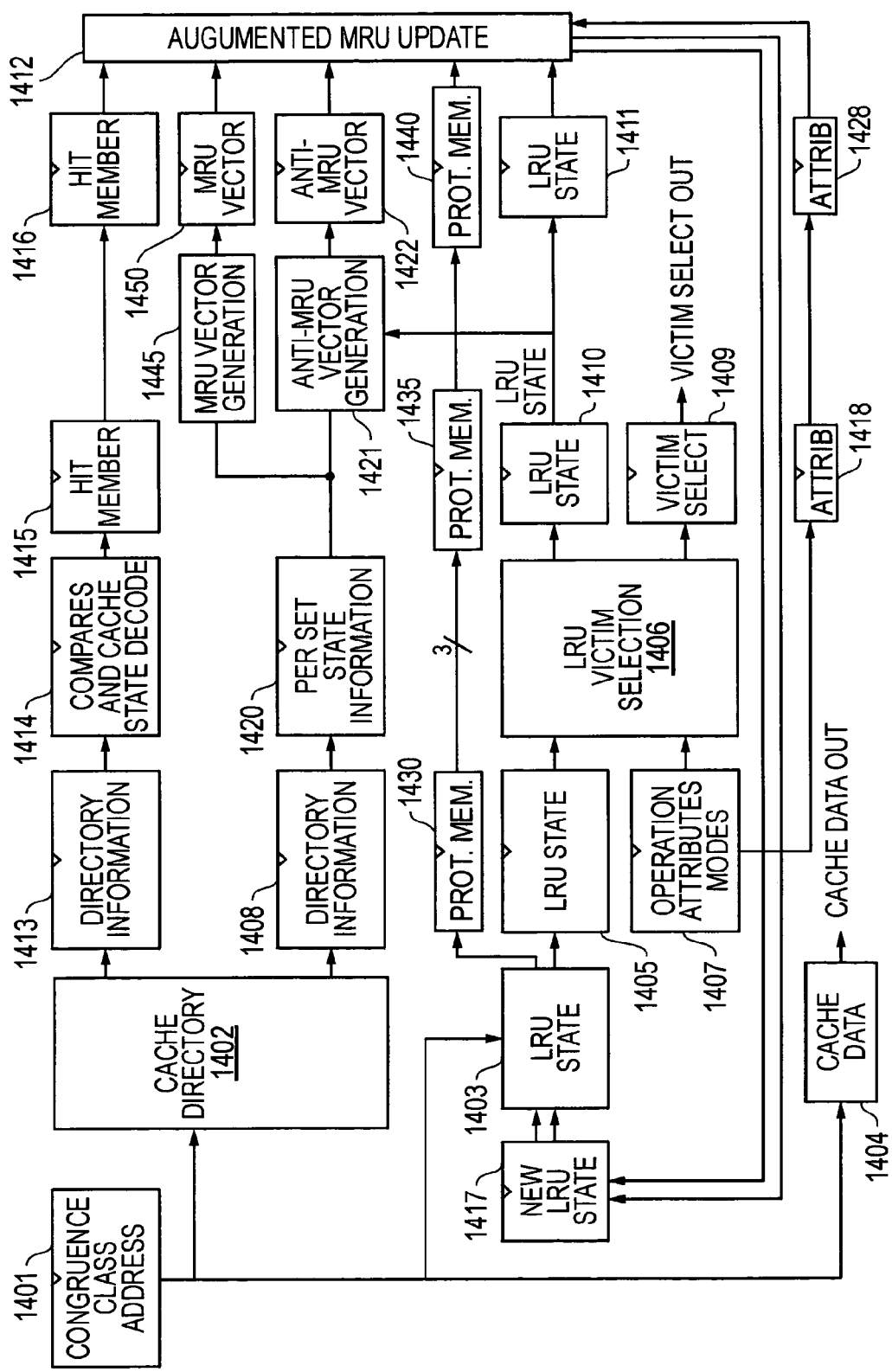
FIG. 14 is a cache architecture including an expanded LRU array with member protection bits and D-state vectors pipelined to the MRU update logic to respectively protect a preselected member and prevent selection of a member in the D state during victim selection in accordance with illustrative embodiments of the present invention.

FIG. 14 illustrates an expanded block diagram representation of a cache architecture in which the member protection bits are pipelined from LRU state array to MRU update logic. As illustrated, the protection bits are latched through a series of latches, while LRU victim selection with I-state biasing and D-state steerage to MRU is being carried out. The biasing of I states is described above, accompanying the description of FIG. 12. An analysis of the path of the protection bits through the cache is now provided to more completely described the mechanisms involved. D-state steerage to MRU, which is the focus of the present invention, is described below and occurs independent of the pipelining and processing of the member protection bits.

Since some of the logic blocks and associated processes of FIG. 14 have previously been described in FIG. 12, only these logic blocks and processes relevant to the enhancements illustrated within FIG. 14 are given detailed coverage in the following description. That is, the description of FIG. 14 focuses on the pipelining of the member protection bits and associated functionality. Additional logic required to complete the actual determination and final selection of the protected member for MRU protection are provided in the circuit diagram of FIGS. 13A-13C and logic diagram of FIG. 15.

Similar to the above description of FIG. 12, the cache congruence class index (or address) is held in latch 1401. From there, the address is simultaneously routed to the directory array 1402, the LRU state array 1403, and, for operations which speculatively read the cache, to the data array 1404.

From LRU state array 1403, the 13 state bits for the accessed congruence class is read and deposited into latch 1405. Contemporaneously with forwarding the 13 state bits to latch 1430, the member protection bits are placed into a first latch 1430.

Victim selection logic 1406 selects a victim (via mechanisms/processes described above) and the selected victim member position is deposited in latch 1409. Victim selection logic 1406 then passes along some or all of the LRU state information to MRU update logic 1412, via pipelined latches 1410 and 1411. As described above, the "hit member" information is deposited into latch 1415, and pipelined forward to latch 1416, from which it is routed to MRU update logic 1412. Further, anti-MRU logic generates an anti-MRU vector, which is also routed from latch 1422 to MRU update logic 1412.

Contemporaneously with the above processes, member protection bits are also passed to MRU update logic 1412 via pipelined latches 1435 and 1440. The use of pipelined latches 1435 and 1440 enables member protection bits to arrive at augmented MRU update logic 1212 at substantially the same time as the LRU state information, hit member vector (from latch 1416) and anti-MRU vector (from latch 1422).

Also, as the member protection bits are being passed through the cache circuitry, attributes of the operation are latched at operation attribute latch 1407 and these attributes are pipelined to MRU update logic 1412 via latches 1418 and 1428. The attributes are utilized in the selection process for determining when a new member (or different instruction) is to be selected for protection. In one embodiment, the attributes indicate whether or not the operation is an instruction fetch (I-fetch) operation, and the protection bits are updated so that they point to the member hosting the fetched instruction.

The logic flow associated with hit member, LRU state information, and anti-MRU vector inputs were previously discussed with reference to FIG. 12. Features related to each other input are addressed above, and the current description references those inputs only where they impact the processing of the member protection bits as related to the present invention. Most important for the present invention(s) is the information related to the processing of the Deleted vector input (from latch 1450), as described in the titled section below.

Also, according to the invention, augmented MRU update logic 1412 takes advantage of a property of chronology vectors, which property allows multiple update operations to be carried out upon a chronology vector simultaneously. Utilizing this property, the MRU update function is able to perform multiple make MRU updates and multiple "anti-MRU" updates simultaneously. When taking advantage of chronology vectors to perform multiple updates simultaneously, the ordering is biased either toward "1" encodings (set-dominant) or "0" encodings (reset-dominant).

Figure 15:
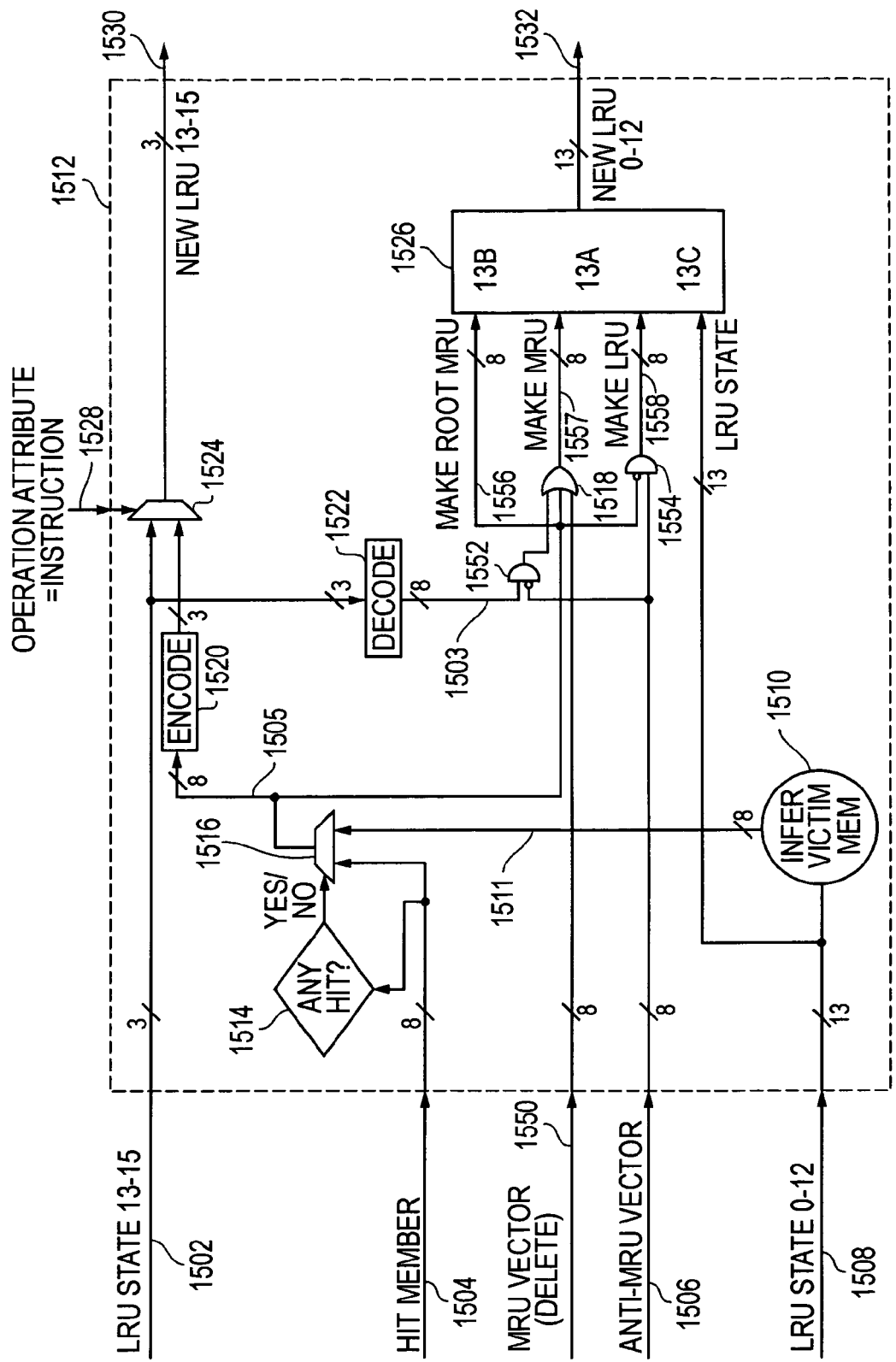
FIG. 15 is a block diagram illustrating logic components of the MRU update logic, configured to support both MRU allocation for valid, protected members and D state steerage to MRU in accordance with illustrative embodiments of the present invention.

Turning now to FIG. 15, there is illustrated a block diagram representation of the augmented MRU updated logic 1512, which includes additional logic components required to support the additional inputs of member protection bits and D-state MRU vector. MRU update logic 1212 increases in complexity because of the addition of the protected bits and functionality associated therewith. Most importantly, the less complex configuration requires a single make MRU input vector (from hit member vector and anti-MRU vector) sent to a make MRU/LRU logic. This single make MRU input vector is utilized to toggle all of the 13 chronology vectors (LRU state bits 0-12). An exemplary circuit illustrating the single inputs to the make MRU/LRU logic to support FIG. 12 is provided as FIGS. 13A-13B of co-pending application, Ser. No. 10/425,549, previously incorporated herein by reference.

The illustrative embodiment of the invention refers to the chronology tree structure of FIG. 7, which defines a specific 2-level chronology relationship between the 8 members of the congruence class using 13 bits. As explained above, bit 0 of the LRU state bits is a pointer that takes on one of two values, a first value "0" pointing to the chronology vectors of the first group of members (bits 1-6, which indicates the precise ordering of cache lines A, B, C, and D) and a second value "1" pointing to the right set of lower level bits (bits 7-12, which indicates the precise ordering of cache lines E, F, G, and H).

Because the 0 bit serves as the control bit in a tree-like configuration of bits (as illustrated by FIG. 7), the 0 bit is hereinafter referred to as the root bit for the chronology tree. The term "root" is utilized to refer more generally to the pointer position in a tree of chronology vectors.

Within the context of a protected member and/or a D-state non-victim selection, the logic of the conventional victim selection using the 13 state bits breaks down, unless adequate consideration is given to the biasing features of the protected member and/or D-state member being made MRU during every iteration of the LRU victim selection process. With previous configurations of MRU update logic 1212, when statically set states (such as the D state and member protected state) are introduced into the make MRU process, these static states cause the root (0) bit to always point the LRU victim selection logic away from the sub-group that contains the static state member. The static state member is made MRU during each iteration, and thus the root bit is biased to always point to the other sub-group, away from the recently established MRU member.

Thus, for example, if member F (of sub-group EFGH) is deleted, then for every iteration, state bit 0 will be always set to point away from group EFGH and towards group ABCD), effectively disabling one half of the cache from victim selection and negatively impacting correct operation of the cache. Rather than protecting the protected member or hiding the Deleted member, the conventional MRU update logic 1212 protects every member of an entire sub-group of cache lines (e.g., EFGH) from ever being selected as a victim. This is an unintended and undesirable consequence.

The invention thus implements a new configuration of MRU update logic (1512) that supports/provides separate handling for updating the root bit and the other state bits. The separate handling is required so that a static state member does not prevent the LRU victim selection process from having access to both groups of members (via the chronology bits) within the congruence class. Thus, the invention introduces a make root MRU input, by which the root bit is updated. Make root MRU provides a separate set of inputs from the make MRU inputs, which now only affect the remaining 12 LRU state bits (chronology vectors). The new make MRU vectors thus update only the LRU state bits 1-12, and a separate set of vectors to make root MRU input are utilized to set/toggle the root bit 0.

While aspects of the invention are described with reference to a particular LRU scheme of chronology vectors, e.g., a 2 level LRU scheme, those skilled in the art will appreciate that the invention is applicable to any multi-level (i.e., not just a two-level) tree LRU scheme. The invention requires a multi-entity chronology vector (e.g., a 4-entity vector as provided in the illustrated embodiment) in the leaf (or bottom) level of the tree. The invention restricts non-root MRU updates to affect the leaf (or bottom) level only, leaving the root and any intermediate levels unchanged. While intermediate levels are not illustrated or described in the above embodiment, those skilled in the art will further appreciate that the technique provided is applicable to such multi-level schemes.

Figure 13A:
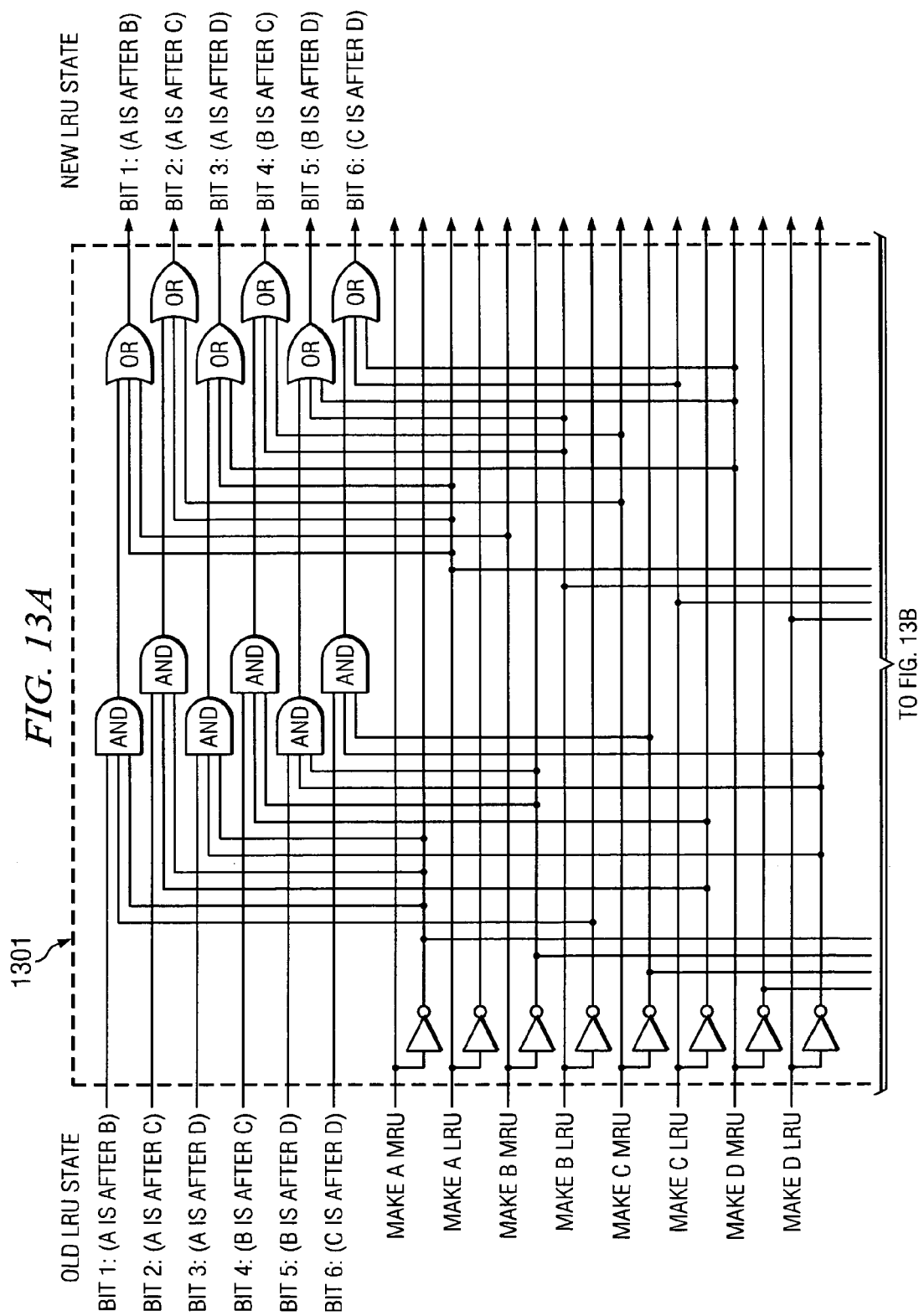
FIGS. 13A, 13B and 13C represent a circuit diagram of an exemplary MRU update function, which has been augmented by member protection and D-state steerage capabilities in accordance with embodiments of the present invention.
Figure 13B:
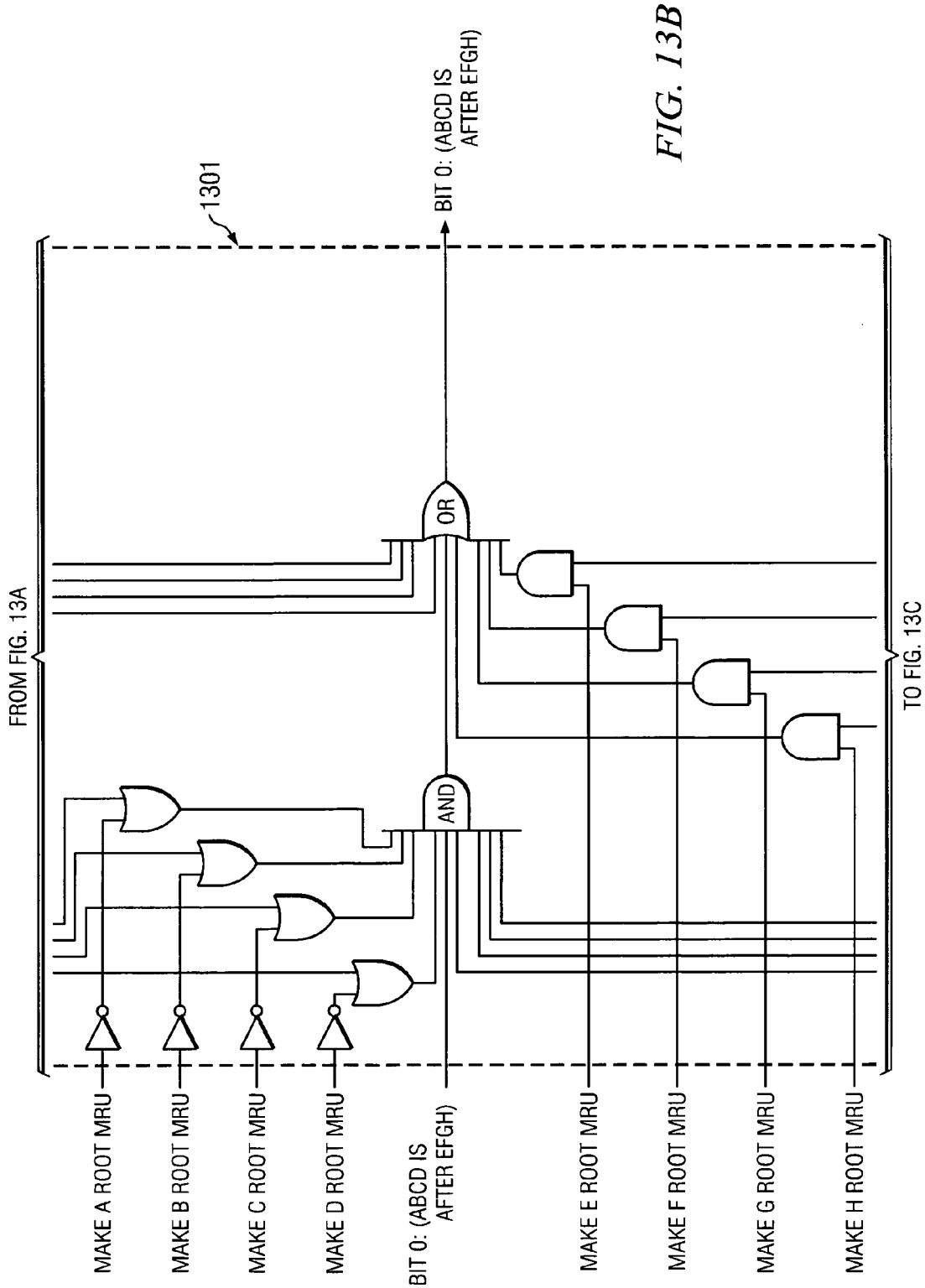
Figure 13C:
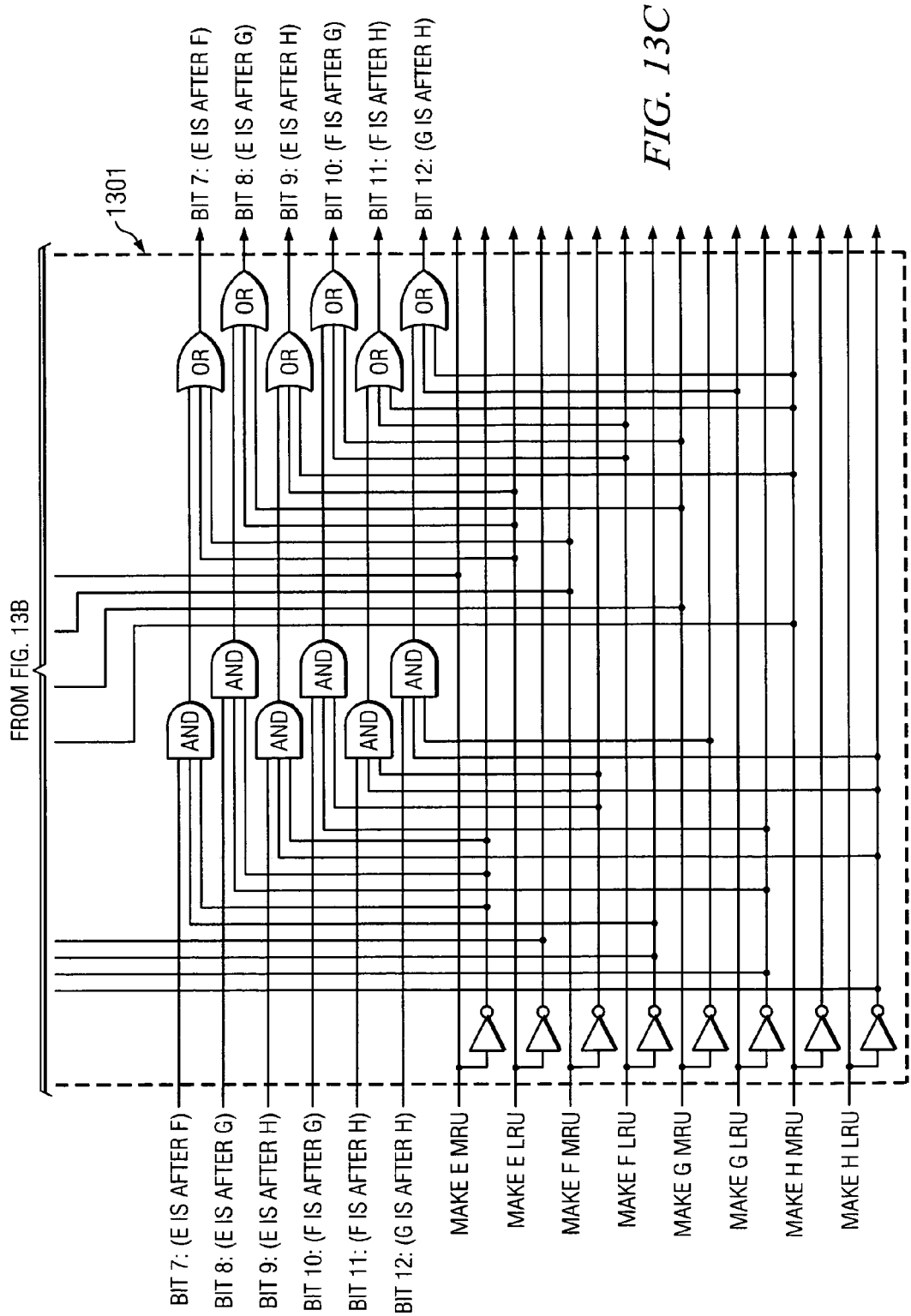

The circuitry provided in FIG. 13A-13C and specifically 13B allows for this features. FIGS. 13A-13C illustrate an internalized view of the circuitry within make MRU/LRU logic 1526. Specifically, FIG. 13B illustrates the new set of inputs to the circuit, make root MRU, which determine whether the root bit is to be toggled during a make MRU process. The general functionality associated with the generation of these inputs as well as other features of the invention are now described. As will be clear with the below description of FIG. 15, the make root MRU input is triggered only when a make MRU function is triggered that results from a hit or victim member selection.

Returning now to FIG. 15, augmented MRU updated logic 1512 receives as input (1) LRU state vector 1508 (a 13 bit wide input vector representing the current LRU states), (2) anti-MRU vector 1506 (an 8 bit wide vector that feeds into AND/NOT gate 1554, which feeds the make MRU input to make MRU/LRU logic 1526), (3) hit member vector 1504 (also an 8 bit vector that feeds into MUX 1516, whose functionality is described below), and (4) member protection bits (LRU state bits 13-15 identifying a pre-selected member that is to be protected).

In addition to the above inputs, an MRU vector 1550 (an 8 bit vector representing Delete state member(s)) is illustrated. However, the functionality associated with MRU vector 1550 is described in the section below titled "D-State Steerage to MRU."

MRU update logic 1512 includes make MRU/LRU logic 1526, which receives four sets of inputs. These inputs are: (1) 13 bit LRU state vector 1508; (2) 8 bit make LRU vector 1558; (3) 8 bit make MRU vector 1557; and (4) 8 bit make root MRU vector 1556. The 13 bit LRU state vector, received directly from staging latch 1411, has been previously described. Each of the other inputs are derived from a selection process/pipeline, including one or more logic components and multiple permutations of the above inputs to MRU update logic 1512. For example, with the addition of the member protection bits and D-state vector, three sets of inputs are ORed together to provide the single "make MRU" input vector.

Member protection bits 1502 are routed to decode block 1522, which converts the 3 bit input into an 8 bit vector (member protection vector 1503), each bit representing a member within the congruence class with the bit corresponding to the protected member set to logic 1, while all other bits are set to logic 0. This member protection vector 1503 is then routed to AND/NOT gate 1552, which also receives anti-MRU vector 1506 as an input from latch 1422. AND/NOT gate 1552 inverts the anti-MRU vector, and the combination of both allows an MRU update for the member when the member is not Invalid. The anti-MRU vector is used to find an Invalid cache line and make it LRU. Making the cache line LRU conflicts with any attempts to make the protected member MRU, and the conflict is resolved in favor of the inverted anti-MRU input overriding the "default" make MRU status of the previously protected member.

Protection of members in the invalid state may occur because, during initial start up of the cache, the protection bits defaults to one of the members (e.g., the member at location 000), before the cache becomes populated. The selected member becomes the initial protected member before that member has valid information stored therein. This condition is treated as a "don't care" condition, since the protection bits point to a stale or invalid member, which may eventually be selected as an LRU victim with the above described logic.

A 0 output of the AND/NOT gate 1552 disables/turns off the make MRU function for that member and thus makes the member eligible for victim selection as an Invalid member. A 1 output, however, results in the member being made MRU, indicating the member is valid and is protected from victim selection.

The output of AND/NOT gate 1552 represents one input to OR logic 1518, which receives two additional inputs, MRU vector 1550 and the output 1505 from MUX 1516. MRU vector 1550 or "delete" MRU vector is described below. The three inputs are all ORed together to provide a single make MRU vector 1557 that is inputted to make MRU/LRU logic 1526.

MUX 1516 receives as its inputs hit member vector 1504 and select victim member vector 1511 (from infer victim member logic 1510). MUX 1516 also receives a (single bit) select input from hit determining logic 1514. Hit determining logic 1514 indicates when a hit occurs within the cache, which also indicates that hit member vector 1504 should be selected as the output at MUX 1516. When the request misses at the cache, however, and a victim member is selected, the select signal forwards the victim member vector 1511 as the output at MUX 1516. Otherwise, when there is no operation or the operation was aborted, a 0 vector is outputted.

The output of MUX 1516 is routed to encode logic 1520. Encode logic 1520 takes the 8 bit vector and generates a 3 bit pointer corresponding to the vector (i.e., pointing to the location of the member identified by the vector selected at MUX 1516), and the pointer is provided as one of two inputs to protect selection MUX 1524. Protect selection MUX 1524 receives the member protection bits as its second input. Select input 1528 selects one of the two 3-bit inputs as the output of MUX 1524. Select input 1528 is received from select latch 1428 and indicates whether the operation exhibits the particular attribute that causes member protection to be extended to the member receiving the new instruction. The select input 1528 updates the protected bits to point to the member allocated to the hit/victim member.

When the operation's attribute indicates the operation is an instruction (i.e., the operation exhibits the predetermined attribute for selecting a member to be protected), the select input 1528 triggers selection of the input from the encode logic 1520 as the output from protect selection MUX 1524. This output represents new LRU state bits 13-15 1530, and points to the member to be protected. Otherwise, member protection bits 1502 are selected and the LRU state bits 13-15 1530 remains the same.

Hit/miss MUX 1516 also provides three output lines utilized in generation of the three inputs to make MRU/LRU logic 1526. The first output is to make root MRU 1556, which is an 8 bit vector that triggers when the root bit (LRU state bit 0) is updated. The functionality associated with make root MRU 1556 is described above. As shown, the make root MRU 1556 receives an input vector only when a hit member vector or a victim select vector is selected at MUX 1516. When neither condition occurs, make root MRU 1556 receives a null input and the root bit is not updated/toggled.

The second output from Hit/Miss MUX 1516 is to OR logic 1518, which has been described above. The hit member and/or selected victim member is made MRU (LRU bits 1-12) via this input, which triggers input 1556. Finally, the third output is provided as input to a second AND/NOT gate 1552. The second input to AND/NOT gate 1552 is anti-MRU vector 1506, which selects the member in the I states as the member to make LRU. AND/NOT gate 1554 provides a make LRU output vector which serves as the third input to make MRU/LRU logic 1526. Accordingly, a member that is the anti-MRU member is only made LRU when that member is not also the hit member or the selected victim member. If the anti-MRU member is the current hit member of selected victim member, then the make LRU function/operation for that member is overridden, because the member cannot be both LRU and MRU at the same time. This override occurs because the selected victim is being replaced by a new valid entry, which becomes a MRU member and thus should not be tagged for LRU victim selection.

Output from augmented MRU update logic 1512 thus includes all components of the new LRU state vector. These are LRU state bits 0, 1-12 1532, indicating which member to select as LRU victim during the next victim selection process, as well as LRU state bits 13-15 1530, pointing to/indicating the member within the congruence class to be protected. These output bits are then routed to and stored within the LRU state array 1403, replacing the previous LRU states within the LRU state array 1403.

D-State Steerage to MRU

In addition to the above described protection for select members, special pipelining and processing is also provided for members that are identified with D states within the cache directory. This added feature runs in parallel to the above described processes, but provides direct MRU steerage for all delete (D) states within a set. Special handling of members tagged with the D state is required because of the potential for the D state to be selected as a victim and crash the system. References to this special handling of D states have been made above. A more detailed analysis of that process is now provided.

The invention provides an improved method and apparatus for preventing selection of Deleted (D) members as an LRU victim during pipelined operations for LRU victim selection. During each cache access targeting the particular congruence class, the deleted cache line is identified from information in the cache directory. A location of a deleted cache line is pipelined through the cache architecture during LRU victim selection. The information is first latched and then passed to MRU vector generation logic, which generates a D member MRU vector. The MRU vector is passed to the MRU update logic, which tags the deleted member to be treated as a MRU member.

The tagging of the deleted cache line as MRU may occur contemporaneously with other members of the congruence class also being tagged MRU. In one embodiment, MRU selection of a D cache line occurs contemporaneously with member protection of other cache lines and while biasing I-states for LRU victim selection.

The hardware/logic by which this additional make MRU function is supported is illustrated within FIG. 14 and FIG. 15. The invention thus further expands the cache architecture to enable steering the victim selection process away from ever selecting any member in the D state. This is achieved while still biasing the MRU steerage for I-states, and while protecting members identified by the protection bits, as described above.

As shown by FIGS. 14 and 15, additional logic components (latches, vector generation logic etc.) are provided to avoid the selection of a member tagged with a D state by marking as MRU all members in D state. Once made MRU, the member (s) in the D state is not selected during victim selection.

With reference to FIG. 14, a separate D-state pipeline is provided through the cache circuitry, overlapping in some places with the I-state pipeline, described above. The D-state pipeline avoids the circuit timing challenges imposed by the selection process for the deleted member by utilizing deleted member information to bias the MRU state when an MRU state update occurs. The D-state biasing is different from the I state biasing since the I-state biases the LRU victim selection to select the member in the I-state during the next victim selection. The D state, in contrast forces the MRU selection to always tag as MRU the member in the D state and prevent selection of the member during each subsequent victim member selection.

To insure that the impact of a compartment deletion is accounted for during the initial victim selection process, the logic that writes the D-state to the cache directory 1402 initiates at least one cycling of the victim selection logic shown in FIG. 14 so that the D-state is read from directory 1402, and a corresponding MRU vector passed into augmented MRU update logic 1412, so as to impact the new LRU state 1417 that is written back to LRU array 1403. The initial cycling is performed prior to any subsequent cycling of the logic for the same congruence class address, so that the subsequent cycling of the logic (for a victim selection) will observe the new LRU state (affected by the deletion) when it reads the state from LRU array 1403 to forward to LRU victim selection logic 1406.

During each subsequent cycle, cache directory 1402 is read for deletions in addition to hits, misses and invalid states, since MRU update is triggered in each case at augmented MRU update logic 1412 occurs in all cases. A deleted member is identified within the cache directory 1202 and the member identifying information is pipelined through set state latch 1408 and latch 1420 to MRU vector generation logic 1445. The pipelining of D-state information and generation of D-state MRU vector is completed contemporaneously with the I-state pipelining and anti-MRU vector generation and LRU victim selection. The information provided within set state information latches 1408 and 1420 indicates/provides all information about a set, including both whether the member is tagged with an I state or whether the member is tagged with a D state, etc. All set state information is then pipelined together in single set state information latches 1408 and 1420. The MRU and anti-MRU split for D-states and I-states, respectively, then occurs once the set state information is forwarded past the latch 1420.

Vector generation logic 1445 takes the information received from latch 1420 and generates a D-state MRU vector, which is placed in latch 1450. D-state MRU vector comprises one bit per member in the congruence class. For each member, the bit indicates whether or not the member is deleted, with a "0" value indicating that the cache line in a given member position is operational (not deleted), and a "1" value indicating that the cache line in the given member position is deleted.

The D-state MRU vector is deposited in latch 1450, from which the vector is sent/forwarded to augmented MRU update logic 1412. As described above, in addition to this MRU vector, augmented MRU update logic 1412 receives a pipelined indication of which member was speculatively selected as a potential victim from staging latch 1411, which member is protected from member protection latch 1440, information on the attributes of the operation from attribute latch 1428, the contents of anti-MRU vector latch 1422, and a hit member vector, if any, from hit member latch 1416.

Referring again to FIG. 15, when a D-state MRU vector is pipelined through the logic of FIG. 14 to MRU update logic 1512, D-state MRU vector is sent as one of multiple inputs to OR gate 1518. This 8-bit D state MRU vector 1550 adds to the list of members that are eventually made/tagged as MRU.

In one embodiment, a restriction is built into the processing/handling of the D-state members. If the leaf nodes in the LRU tree are comprised of k-entity chronology vectors, then only (k−1) compartments (cache lines) may be deleted per congruence class subset ordered by a given chronology vector. Deletion of k cache lines would result in a crash of the system as the cache is faulty. Thus, the features of the invention/application are applicable for only caches with at least one valid, undeleted member/cache line.

Thus, the present invention also provides an improved method, apparatus, and computer for augmenting the make MRU process during selection of victims (LRU members). The mechanism of the present invention uses data from the cache directory to identify deleted cache lines. In response to detecting a deleted line, the deleted line is selected/biased to be made MRU, thus preventing the line from being marked or biased to be a victim. In this manner, this deleted cache line is marked as MRU when the subsequent victim selection process occurs (whether due to a cache hit or during a cache miss). In the depicted examples, if multiple deleted cache lines are present, each of those cache lines are selected to be the made MRU.

As a final matter, it is important to note that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a memory component, a method comprising:
   selecting, within a first pipelined path, a least recently used (LRU) victim member from a congruence class; and
   biasing a faulty member of the memory component against being selected as the victim member by the first pipeline path, said faulty member corresponding to a cache line that is unable to provide proper caching operation;
   separately making the faulty member MRU without affecting a directional pointer of LRU selection chronology vectors for a multi-level chronology vector LRU selection mechanism; and
   receiving information about which member is a faulty member from a directory via a second pipeline path, separate from the first pipeline path;
   generating a make MRU vector from an index indicating one or more locations of faulty member(s) and forwarding the make MRU vector to an MRU update logic that performs a make MRU operation, independent of a pipelining and processing of member protection bits for generating a final make MRU vector.

2. The method of claim 1, further comprising:
   responding to an operation at a cache directory by issuing per set state information to a pipeline process, said information utilized to determine which member of the congruence class is unable to provide proper caching operation;

forwarding the per set state information to an MRU vector generation logic, which generates a D member MRU vector and passes the D member MRU vector to an MRU update logic, which tags the faulty member to be treated as a MRU member;

wherein said tagging the faulty member includes logic for tagging the faulty member as MRU, while tagging other non-faulty members as MRU and biasing I-states for LRU victim selection.

3. The method of claim 2, further comprising:

determining whether a faulty member exists within the congruence class from per set state information;

concurrently pipelining an index indicating which member within the congruence class is the faulty member that is unable to provide proper caching operation; and tagging the faulty member as an most recently used (MRU) member to prevent the selection of the faulty member as the LRU victim member;

wherein the faulty member is tagged as one MRU member contemporaneously with other members of the congruence class also being tagged MRU.

4. The method of claim 1, wherein said cache line that is unable to provide proper caching operation is a deleted line and said faulty member is a D-state member, said method further comprising:

determining which member among the congruence class is a D-state member from per set state information within a directory of the memory component; and said tagging the faulty member includes tagging the D-state member as MRU, while tagging other non-faulty members as MRU and biasing I-states for LRU victim selection.

5. The method of claim 1, wherein the biasing a faulty member of the memory component against being selected as the victim member by the first pipeline path, includes concurrently biasing each of multiple faulty members against selection as a victim member.

* * * * *